(12) United States Patent
Takata

(10) Patent No.: US 12,510,697 B2
(45) Date of Patent: Dec. 30, 2025

(54) OPTICAL ELEMENT, OPTICAL APPARATUS, SYSTEM, AND METHOD OF MANUFACTURING THE OPTICAL ELEMENT

(71) Applicant: CANON KABUSHIKI KAISHA, Tokyo (JP)

(72) Inventor: Atsushi Takata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 515 days.

(21) Appl. No.: 18/181,719

(22) Filed: Mar. 10, 2023

(65) Prior Publication Data

US 2023/0305199 A1 Sep. 28, 2023

(30) Foreign Application Priority Data

Mar. 28, 2022 (JP) ................. 2022-052302

(51) Int. Cl.
| | |
|---|---|
| G02B 5/04 | (2006.01) |
| B29C 45/00 | (2006.01) |
| B29C 45/14 | (2006.01) |
| B29C 45/27 | (2006.01) |
| B29L 11/00 | (2006.01) |
| G02B 7/18 | (2021.01) |
| G02B 27/01 | (2006.01) |

(52) U.S. Cl.
CPC ............ *G02B 5/04* (2013.01); *B29C 45/0025* (2013.01); *B29C 45/14* (2013.01); *B29C 45/2708* (2013.01); *G02B 7/1805* (2013.01); *G02B 27/0172* (2013.01); *B29C 2045/0032* (2013.01); *B29L 2011/00* (2013.01); *G02B 2027/0132* (2013.01)

(58) Field of Classification Search
CPC ........ B29C 45/14; G02B 5/04; G02B 7/1805; B29L 2011/00
See application file for complete search history.

(56) References Cited

U.S. PATENT DOCUMENTS

| | | | |
|---|---|---|---|
| 2002/0030900 A1* | 3/2002 | Tominaga | ........... B29C 45/2708 425/470 |
| 2003/0026007 A1 | 2/2003 | Yamamoto | |

FOREIGN PATENT DOCUMENTS

| | | | | |
|---|---|---|---|---|
| DE | 3809969 A1 * | 10/1989 | ............. | B29C 45/14 |
| JP | 2001-219447 A | 8/2001 | | |
| JP | 2001-353761 A | 12/2001 | | |
| JP | 2013-137412 A | 7/2013 | | |

* cited by examiner

*Primary Examiner* — Alexander P Gross
(74) *Attorney, Agent, or Firm* — Venable LLP

(57) ABSTRACT

An optical element made of resin includes a first surface configured to serve as an optical surface, a second surface configured to serve as an optical surface, a third surface configured to serve as an optical surface, and a fourth surface configured to connect to the third surface. The third surface includes a peripheral area and an inner area, and a distance from an outer edge of the third surface to a position in the peripheral area is equal to or smaller than 5 mm and a distance from the outer edge of the third surface to a position in the inner area is larger than 5 mm. A weld is formed in at least any one of the peripheral area of the third surface and the fourth surface.

20 Claims, 19 Drawing Sheets

OPTICAL ELEMENT, OPTICAL APPARATUS, SYSTEM, AND METHOD OF MANUFACTURING THE OPTICAL ELEMENT

BACKGROUND OF THE INVENTION

Field of the Invention

The present invention relates to an optical element, such as a prism, made of resin, a method of manufacturing the optical element, and the like.

Description of the Related Art

The optical prism is an optical element having optical functions, such as refraction, dispersion, and total reflection. In general, the optical prism is thicker than the optical lens, and has a polyhedral shape. As a method of manufacturing the optical prism, a method of injection-molding the optical prism by using a thermoplastic resin is known. For injection-molding an optical prism, a mold that contains a space (cavity) is used. The space (cavity) has a shape that corresponds to the shape of the polyhedral shape of the optical prism. The cavity is filled with molten resin, and then the molten resin is cooled and solidified for obtaining the resin prism.

However, the resin material that is a raw material of the optical prism significantly differs, in thermal conductivity, from the metal material of the mold. Thus, when the resin having been injected into the cavity is cooled and solidified, a temperature distribution is easily produced in the resin. In particular, since the thick optical prism has a large heat capacity, it is difficult to quickly dissipate heat, remained in the center portion of the prism, into the mold. If the temperature distribution is produced in the resin when the resin is solidified, the strain tends to remain in the resin prism formed in this manner. If the strain remains in the prism, the density of the solidified resin locally becomes uneven, and a refractive-index distribution is produced in the resin. The presence of the strain can be checked by performing the transmitted-wavefront measurement, which is a nondestructive test. If the strain that remains in the prism has a large value, the strain will cause a significant refractive-index distribution, and deteriorate the optical property of the resin prism.

Japanese Patent Application Publication No. 2001-353761 discloses an injection molding method that reduces the internal strain of a prism made of resin. In this method, a core portion of a mold for forming a mirror surface has a function to generate heat. The core portion generates heat in the cooling-and-solidifying process, for delaying the molten resin from being cooled. As a result, the temperature distribution produced in the molten resin is made smaller, and the internal strain of the resin prism is reduced.

Thus, it can be expected that the method disclosed in Japanese Patent Application Publication No. 2001-353761 reduce the internal strain of the resin prism. However, for causing the core portion of the mold to generate heat and delaying the molten resin from being cooled in the cooling-and-solidifying process, an additional time is required for causing the core portion to generate heat and cooling the molten resin gradually. As a result, the molding cycle will increase significantly. In addition, for causing the core portion of the mold to have a function to generate heat, the configuration of the mold apparatus becomes complicated. For these reasons, the method disclosed in Japanese Patent Application Publication No. 2001-353761 has a problem that increases the manufacturing cost of the resin prism.

Thus, it has been desired to achieve a method that can mass-produce optical resin elements having excellent optical property in practical use. An object of the present invention is to provide a technique that is effective for achieving an optical resin element having excellent optical property.

SUMMARY OF THE INVENTION

According to a first aspect of the present invention, an optical element made of resin includes a first surface configured to serve as an optical surface, a second surface configured to serve as an optical surface, a third surface configured to serve as an optical surface, and a fourth surface configured to connect to the third surface. The third surface includes a peripheral area and an inner area, and a distance from an outer edge of the third surface to a position in the peripheral area is equal to or smaller than 5 mm and a distance from the outer edge of the third surface to a position in the inner area is larger than 5 mm. A weld is formed in at least any one of the peripheral area of the third surface and the fourth surface.

According to a second aspect of the present invention, a method of manufacturing an optical element made of resin is provided. The optical element includes a first surface that serves as an optical surface, a second surface that serves as an optical surface, a third surface that serves as an optical surface, and a fourth surface that connects to the third surface. The method includes inserting a first molded portion made of resin, into a cavity of a mold that includes a transfer surface, the transfer surface including a surface for forming the first surface, the second surface, the third surface, and the fourth surface through transfer, and injecting molten resin from a gate into a space between the first molded portion and the transfer surface of the mold and forming a second molded portion outside the first molded portion. The molten resin injected from the gate is split and flows along the first molded portion, and then one portion of the molten resin and another portion of the molten resin meet with each other and form a weld. The third surface includes a peripheral area and an inner area, and a distance from an outer edge of the third surface to a position in the peripheral area is equal to or smaller than 5 mm and a distance from the outer edge of the third surface to a position in the inner area is larger than 5 mm. The weld is formed in at least any one of the peripheral area of the third surface and the fourth surface.

Further features of the present invention will become apparent from the following description of exemplary embodiments with reference to the attached drawings.

DESCRIPTION OF THE EMBODIMENTS

Figure 1A:
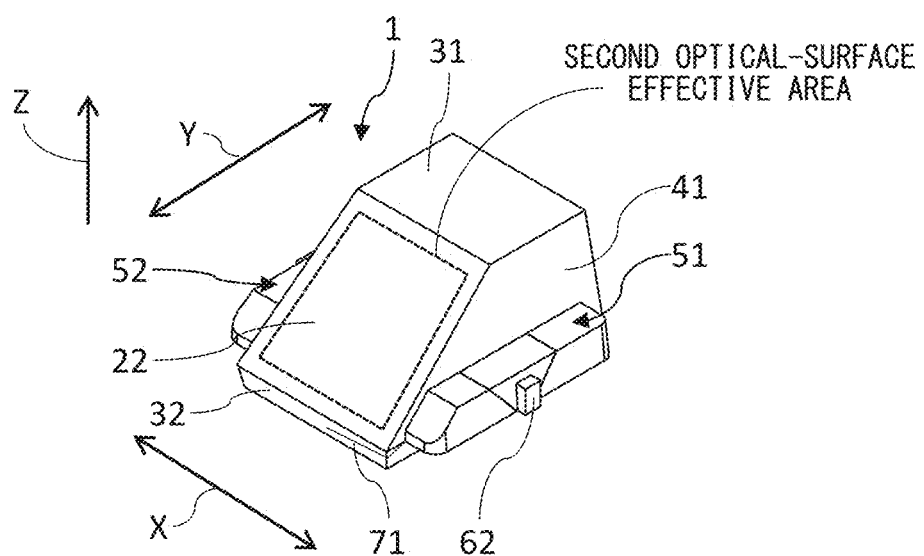
FIG. 1A is a top perspective view of an optical prism 1 of the present embodiment.

Next, an optical resin prism of an embodiment of the present invention and a method of manufacturing the prism will be described with reference to the accompanying drawings. Note that since the embodiments described below are examples, detailed configurations and the like may be modified as appropriate by a person skilled in the art, without departing the spirit of the present invention. In addition, in the drawings referred to in the below-described embodiments, a component given an identical reference numeral has an identical function, unless otherwise specified.

Embodiments

Summary

In the present embodiment, for preventing the strain from remaining in the optical resin prism, the injection molding is performed in two stages. First, a first molded portion made of resin and serving as a core of the optical prism is injection-molded by using a first mold. The first molded portion is cooled, and then is set in a cavity of a second mold. After that, molten resin is injected into the cavity through a gate, so that a second molded portion is injection-molded outside the first molded portion. The molding surface (transfer surface) of the second mold includes an optical-surface transfer area and a non-optical surface transfer area. The optical-surface transfer area is an area for forming an optical surface on the second molded portion, and the non-optical surface transfer area is an area for forming a non-optical surface on the second molded portion. In the present embodiment, since the thick prism is formed in two stages, the amount of molten resin used in one stage is made smaller. As a result, the temperature distribution produced when the molten resin is solidified is made smaller, so that the internal strain produced in the prism can be reduced.

When the second molded portion is injection-molded, the molten resin having been injected from the gate flows along the outer surface of the first molded portion. Specifically, the molten resin is split and flows in different directions, along a top surface, a bottom surface, a right side surface, a left side surface, and the like of the first molded portion. Portions of the molten resin flow from the gate position, as a start point, toward different directions; and then, meet and join with each other in the cavity. When the portions of the molten resin meet with each other, a microstructure called a weld may be formed at a position at which the portions of the molten resin meet, depending on the relationship between the angles of flows of the portions of the molten resin. The weld is a mark formed by the portions of the molten resin meeting with each other; and typically, has a fine groove shape. However, if the weld is formed in an area used practically as an optical surface, the optical property of the prism will be deteriorated. Thus, in the present embodiment, the form of the first molded portion, the form of the second molded portion, the position of the gate of the second mold, and the like are set so that the weld is formed out of the area used practically as an optical surface. In another case, at least one portion of the weld may be formed in a non-optical surface or an area around the optical surface. Specifically, since the weld has a finite length, the length of the weld formed in an area used practically as an optical surface can be reduced by the length of the weld formed in the non-optical surface or the area around the optical surface. That is, the form of the first molded portion and the form of the second molded portion are set so that not only the temperature distribution produced when the molten resin is solidified is made smaller, but also the position at which the weld is formed is out of an area used practically as an optical surface. Hereinafter, the description will be made specifically. Note that since the drawings may schematically show features for convenience of illustration and description, the shape and size of a component and the arrangement of components may not necessarily be exactly equal to the shape and size of a corresponding real component and the arrangement of corresponding real components.

Structure of Optical Prism

Figure 1B:
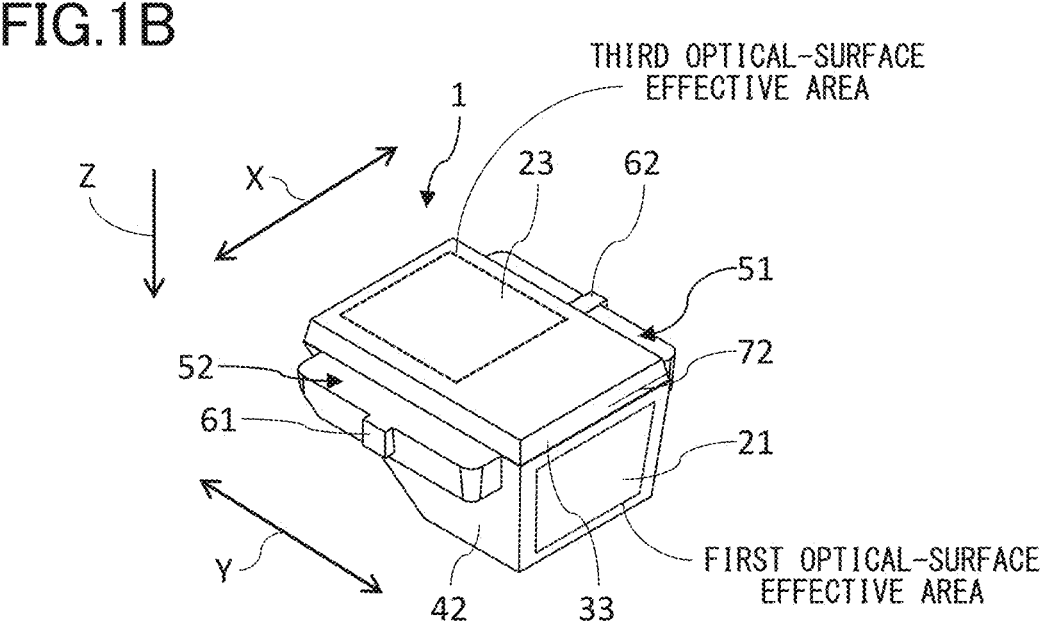
FIG. 1B is a bottom perspective view of the optical prism 1 of the present embodiment.
Figure 2A:
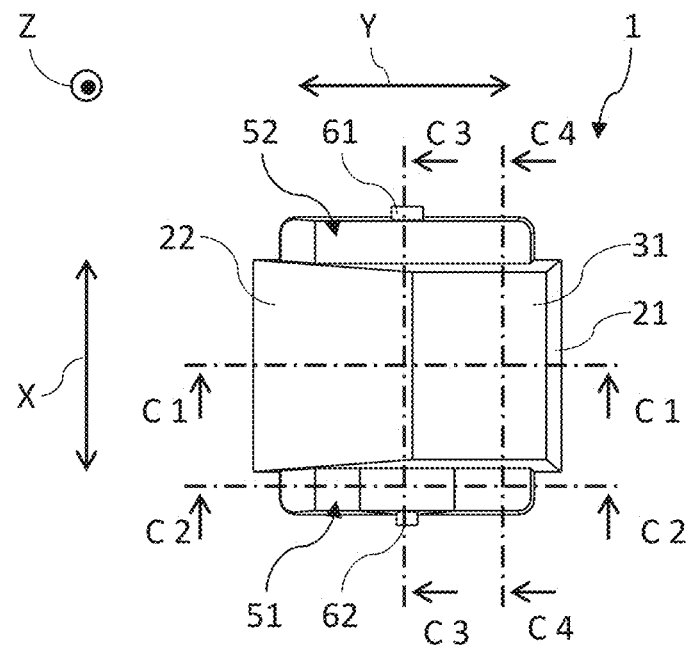
FIG. 2A is a plan view of the optical prism 1 of the present embodiment.
Figure 2B:
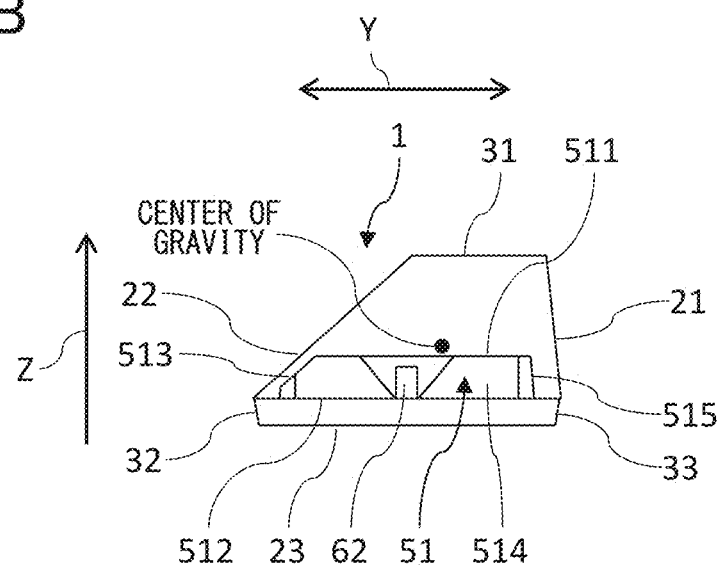
FIG. 2B is a side view of the optical prism 1 of the present embodiment.

FIGS. 1A and 1B are perspective views of an optical prism 1 of the present embodiment, viewed from different directions. FIG. 1A is a top perspective view of the optical prism 1, and FIG. 1B is a bottom perspective view of the optical prism 1. FIG. 2A is a plan view of the optical prism 1 of the present embodiment, and FIG. 2B is a side view of the optical prism 1 of the present embodiment.

The optical prism 1 is an optical component made of resin and having a plurality of (three in this example) optical surfaces. Preferably, the raw material of the optical prism 1 is a thermoplastic resin. Preferably, among various types of the thermoplastic resin, cycloolefin polymer, cycloolefin copolymer, polycarbonate, or acrylic resin is used.

The optical prism 1 includes a first optical surface (first surface) 21, a second optical surface (second surface) 22, and a third optical surface (third surface) 23. The first optical surface 21 can be used as an incidence surface (incidence-and-refraction surface) of rays of light. The second optical surface 22 can be used as an internal total-reflection surface. The third optical surface 23 can be used as an output surface (output-and-refraction surface) of rays of light. In FIGS. 1A and 1B, areas to which an effective flux of light is emitted when the optical prism 1 is practically used are enclosed by dotted lines. That is, among the optical surfaces, the areas enclosed by the dotted lines require the optical property ensured, and are illustrated as a first optical-surface effective area, a second optical-surface effective area, and a third optical-surface effective area. The optical surfaces have high flatness, and the surface roughness Ra of the optical surfaces is smaller than 20 nm. The surface roughness Ra of each surface can be measured, for example, by using a white-light interferometer Newview8300 made by ZYGO corporation.

The optical prism 1 also includes a first non-optical surface 31, a second non-optical surface 32, and a third non-optical surface 33. The first non-optical surface 31 is a surface that connects the first optical surface 21 and the second optical surface 22. The second non-optical surface 32 is a surface that connects the second optical surface 22 and the third optical surface 23. The third non-optical surface 33 is a surface that connect the third optical surface 23 and the first optical surface 21. Since the non-optical surfaces are not areas to which an effective flux of light is emitted when the optical prism 1 is practically used, the non-optical surfaces may have flatness lower than that of the optical surfaces. For example, the non-optical surfaces are rough surfaces whose surface roughness Ra is equal to or larger than 50 nm. However, the non-optical surfaces may have flatness that is as high as the flatness of the optical surfaces.

The optical prism 1 also includes a side surface (first side surface or fifth surface) 41 and a side surface (second side surface or sixth surface) 42. The side surface 41 and the side surface 42 are non-optical surfaces, and can be seen when viewed along an X direction. The side surface 41 connects to each of the first optical surface 21, the second optical surface 22, the third optical surface 23, the first non-optical surface 31, the second non-optical surface 32, and the third non-optical surface 33. The side surface 42 is positioned opposite to the side surface 41, and also connects to each of the first optical surface 21, the second optical surface 22, the third optical surface 23, the first non-optical surface 31, the second non-optical surface 32, and the third non-optical surface 33.

In addition, a first projecting portion 51 is formed so as to project from the side surface 41 in the X direction, and a second projecting portion 52 is formed so as to project from the side surface 42 in the X direction. The first projecting portion 51 and/or the second projecting portion 52 function as positioning-and-fixing portions when the optical prism 1, which is an optical component, is mounted in an optical apparatus.

As illustrated in FIG. 2B, the top surface of the first projecting portion 51 is a first projecting surface 511, and the bottom surface of the first projecting portion 51 is a second projecting surface 512. The second projecting surface 512 is separated more from the center of gravity of the optical prism 1 than the first projecting surface 511 is. Like the first projecting portion 51, the top surface of the second projecting portion 52 is a first projecting surface 511, and the bottom surface of the second projecting portion 52 is a second projecting surface 512. The second projecting surface 512 is separated more from the center of gravity of the optical prism 1 than the first projecting surface 511 is. The arrangement of the first projecting surface 511 and the second projecting surface 512 is important for controlling the flow of molten resin so that the weld is formed out of all the optical-surface effective areas when the second molded portion is injection-molded around the first molded portion (core). The detailed description thereof will be made below.

The first projecting portion 51 also includes a side projecting surface 513, a side projecting surface 514, and a side projecting surface 515. Each of the side projecting surface 513, the side projecting surface 514, and the side projecting surface 515 connects to the first projecting surface 511 and the second projecting surface 512. Similarly, the second projecting portion 52 also includes a side projecting surface 513, a side projecting surface 514, and a side projecting surface 515. Each of the side projecting surface 513, the side projecting surface 514, and the side projecting surface 515 connects to the first projecting surface 511 and the second projecting surface 512.

As illustrated in FIG. 2A, a first gate mark 61 is formed on a leading end of the second projecting portion 52 in a projection direction of the second projecting portion 52. The first gate mark 61 is a mark of an inlet through which the resin is injected when the first molded portion, which is a core (core portion) of the optical prism, is injection-molded by using a first mold. In addition, a second gate mark 62 is formed on a leading end of the first projecting portion 51 in a projection direction of the first projecting portion 51. The second gate mark 62 is a mark of an inlet through which the resin is injected when the second molded portion is injection-molded outside the first molded portion by using a second mold.

For example, the optical prism 1 of the present embodiment has a total length of 30.0 mm in a Y direction, a thickness of 16.0 mm in a Z direction, a total width of 28.0 mm in the X direction. The distance between the side surface 41 and the side surface 42 in the X direction is 20.0 mm. In addition, the thickness of each of the first projecting portion 51 and the second projecting portion 52 in the Z direction is 4.0 mm. Note that since the above-described sizes are examples, the present disclosure is not limited to these sizes.

Weld

As illustrated in FIG. 1A, a linear weld 71 is formed in the second non-optical surface (fourth surface) 32, at a position on the second gate mark 62 side. In addition, as illustrated in FIG. 1B, a linear weld 72 is formed in the third non-optical surface 33, at a position on the second gate mark 62 side. In general, the weld 71 and the weld 72 are formed along the direction in which the first projecting portion projects.

Figure 3A:
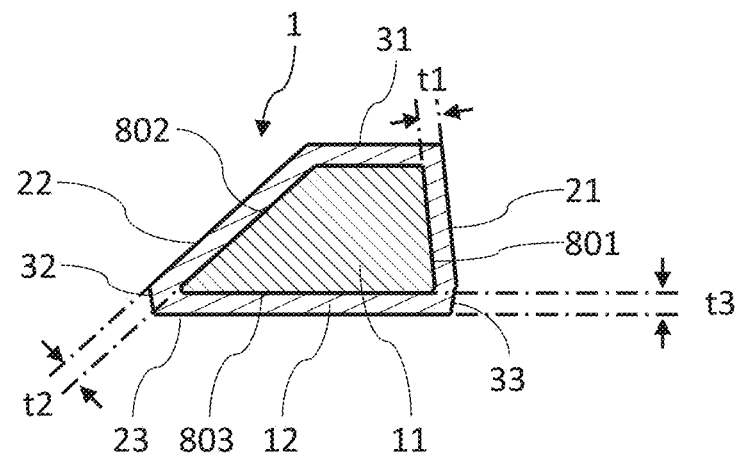
FIG. 3A is a diagram illustrating a cross section of the optical prism 1, taken along a C1-C1 line of FIG. 2A.
Figure 4A:
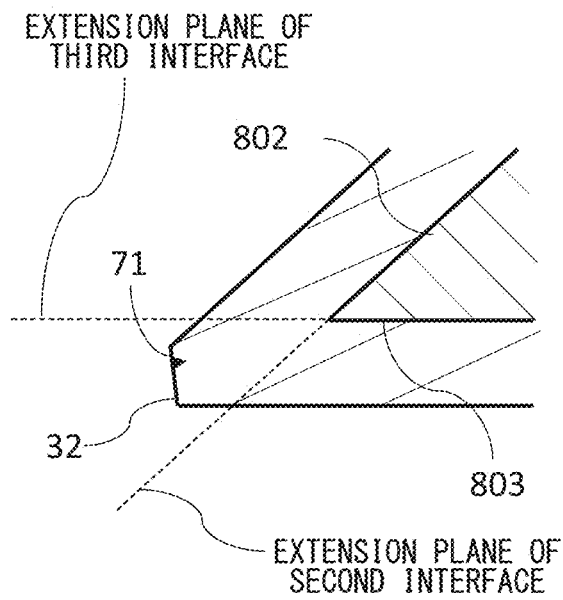
FIG. 4A is a partially enlarged cross-sectional view that includes a position at which a weld 71 is formed.
Figure 4B:
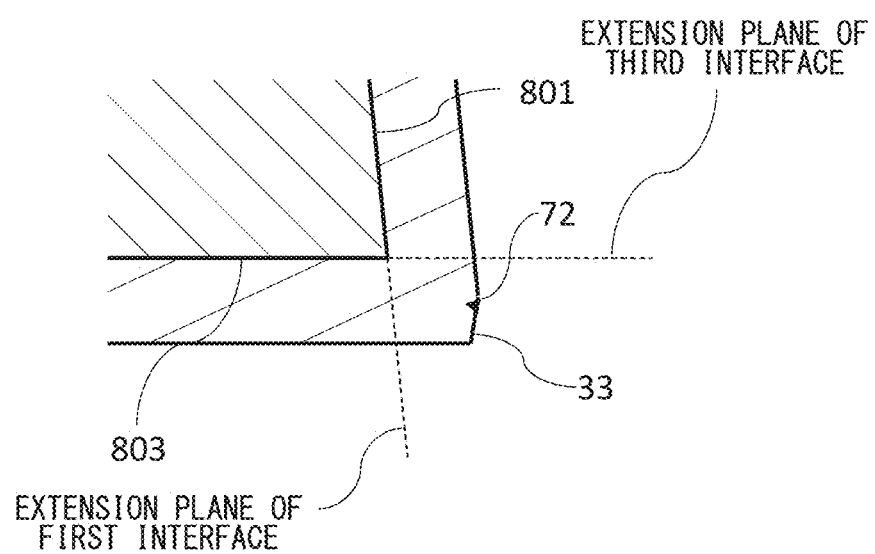
FIG. 4B is a partially enlarged cross-sectional view that includes a position at which a weld 72 is formed.

FIG. 4A illustrates a partially enlarged view of a YZ cross section that includes a position at which the weld 71 is formed. The weld 71 is formed in an area between an extension plane of a second interface 802 and an extension plane of a third interface 803. The extension plane of the second interface 802 and the extension plane of the third interface 803 are indicated by dotted lines in FIG. 4A. In addition, FIG. 4B illustrates a partially enlarged view of a YZ cross section that includes a position at which the weld 72 is formed. The weld 72 is formed in an area between an extension plane of a first interface 801 and an extension plane of the third interface 803. The extension plane of the first interface 801 and the extension plane of the third interface 803 are indicated by dotted lines in FIG. 4B. The first interface 801, the second interface 802, and the third interface 803 will be described below with reference to FIG. 3A.

Figure 5A:
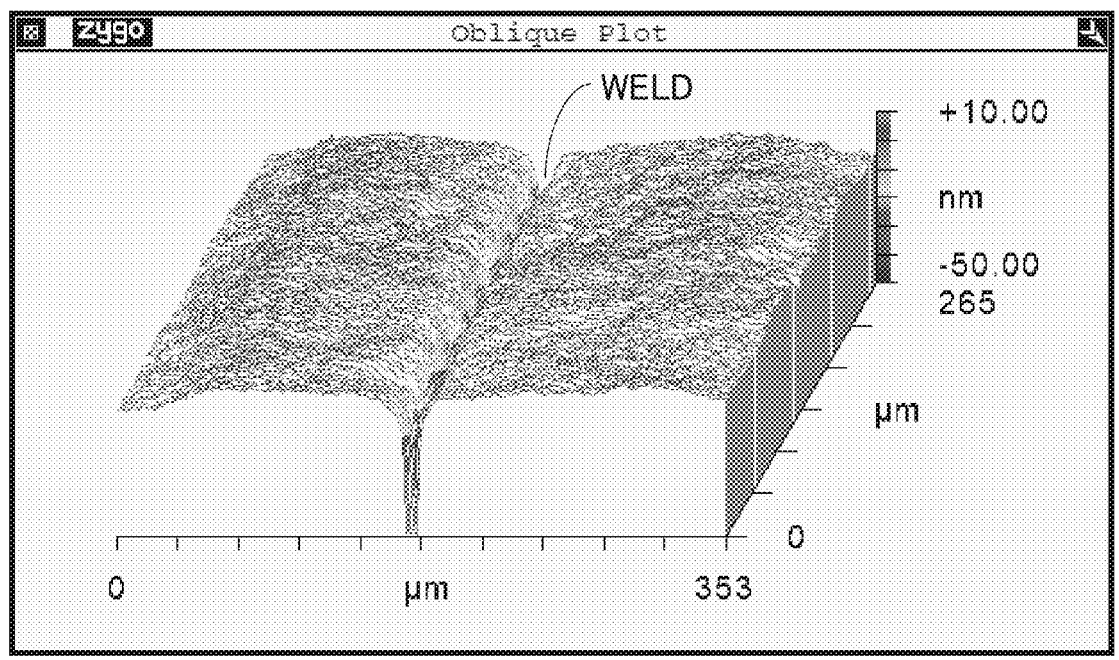
FIG. 5A is a diagram illustrating a measurement result of a surface shape of an area in the vicinity of a weld.
Figure 5B:
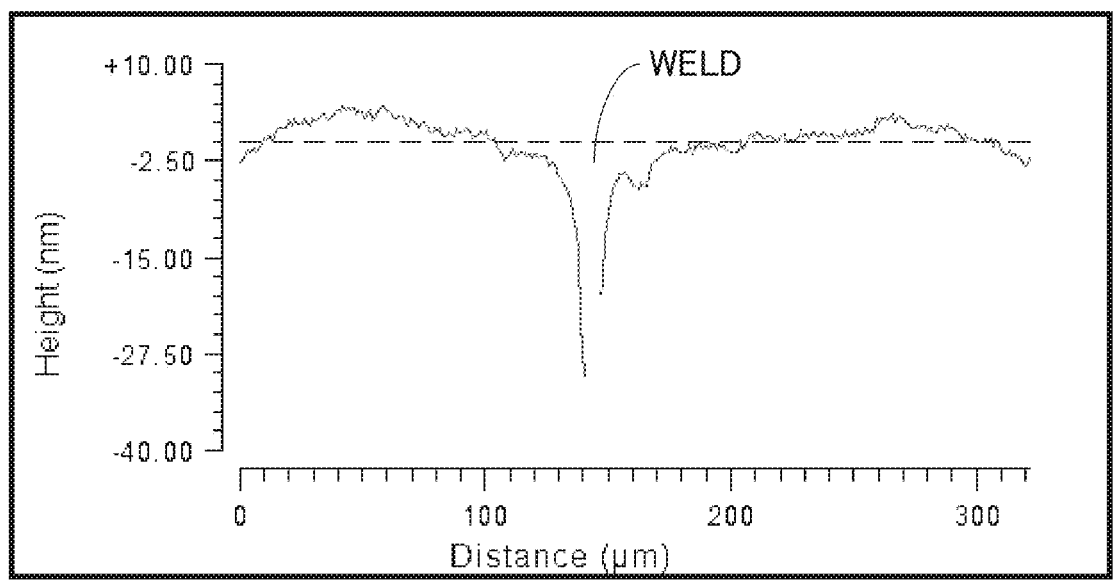
FIG. 5B is a diagram illustrating a measurement result of a cross-sectional shape of the area in the vicinity of the weld.

As described previously, the weld is a mark formed by portions of the molten resin meeting with each other when the second molded portion is injection-molded, and typically has a fine groove shape. FIGS. 5A and 5B illustrate an example of the shape of the weld measured by using a white-light interferometer Newview8300 made by ZYGO Corporation. FIG. 5A illustrates a surface shape of an area in the vicinity of a weld, and FIG. 5B illustrates a shape of a cross section of the optical prism, taken along a direction orthogonal to a direction in which the groove extends. In a typical weld, the groove has a width equal to or larger than 5 μm and equal to or smaller than 50 μm, and a depth equal to or larger than 30 nm and equal to or smaller than 900 nm. If a weld is formed in an optical surface (in particular, in an optical-surface effective area), the optical performance of the optical prism will deteriorate. In the present embodiment, however, since the weld is formed in a non-optical surface, the weld does not adversely affect the practical optical performance of the optical prism 1. Note that although all the weld is preferably formed in a non-optical surface, the weld may be formed out of an optical-surface effective area of an optical surface. Even in this case, the practical optical performance of the optical prism 1 can be prevented from deteriorating. Thus, in the embodiment of the present invention, part or all of a weld may be formed in an optical surface as long as the weld is formed out of the optical-surface effective area of the optical surface. Preferably, the optical-surface effective area is separated from the outer edge of the optical surface by a distance equal to or larger than 0.5 mm and equal to or smaller than 5 mm. This is because if the distance is too small, the weld may extend to the optical-surface effective area when the flow of the resin changes from a predetermined state in the formation of the second molded portion 12. If the distance is too large, the optical prism will be upsized, and the strain will be easily produced. In the present embodiment, the minimum distance from the outer edge of the optical surface to the optical-surface effective area is set at 1.0 mm.

In general, in a case where a weld is formed in an optical surface having high flatness and a surface roughness Ra smaller than 20 nm, the position of the weld is set so as to be separated from the outer edge of the optical surface by a distance equal to or smaller than 5 mm, preferably by a distance equal to or smaller than 0.5 mm. In any optical surface, the position of the weld is set so that the weld is not formed in an inner area of the optical surface that is separated from the outer edge of the optical surface by a distance larger than 5 mm.

As described above, in the present embodiment, the weld is formed in any non-optical surface and/or a position in any optical surface that is separated from the outer edge of the optical surface by a distance equal to or smaller than 5 mm. Thus, the weld is not formed in an inner area of any optical surface that is separated from the outer edge of the optical surface by a distance larger than 5 mm. Note that if the weld is formed in the non-optical surface that is a rough surface, it becomes difficult to visually recognize the weld because the weld is hidden by the rough surface.

Internal Structure of Optical Prism

Figure 3B:
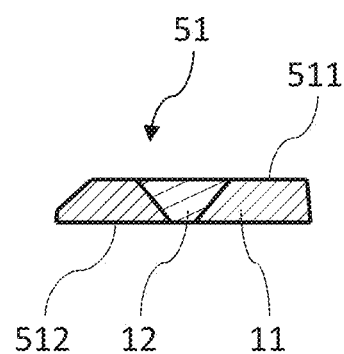
FIG. 3B is a diagram illustrating a cross section of the optical prism 1, taken along a C2-C2 line of FIG. 2A.
Figure 6A:
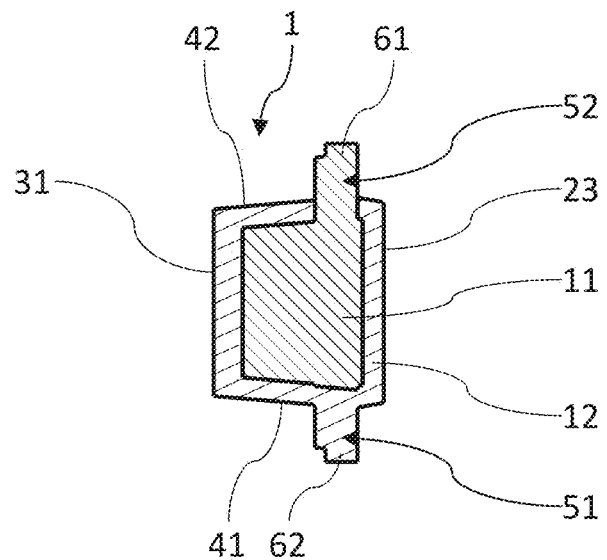
FIG. 6A is a diagram illustrating a cross section of the optical prism 1, taken along a C3-C3 line of FIG. 2A.
Figure 6B:
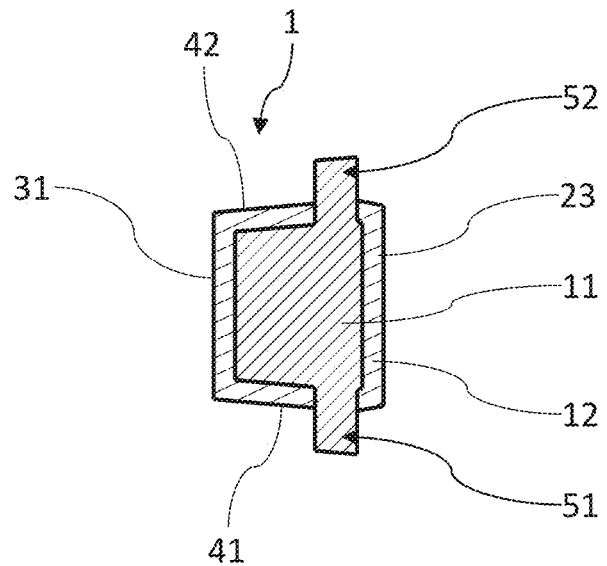
FIG. 6B is a diagram illustrating a cross section of the optical prism 1, taken along a C4-C4 line of FIG. 2A.

Next, an internal structure of the optical prism 1 will be described with reference to cross-sectional views. FIG. 3A illustrates a cross section of the optical prism 1, taken along a C1-C1 line of FIG. 2A; and FIG. 3B illustrates a cross section of the optical prism 1, taken along a C2-C2 line. In addition, FIG. 6A illustrates a cross section of the optical prism 1, taken along a C3-C3 line of FIG. 2A; and FIG. 6B illustrates a cross section of the optical prism 1, taken along a C4-C4 line.

The optical prism 1 includes the first molded portion 11 and the second molded portion 12. The first molded portion 11 is a core (core portion); and the second molded portion 12 is formed outside the first molded portion 11, in close contact with the first molded portion 11. In the present embodiment, since the first molded portion 11 and the second molded portion 12 are made of the same type of material, an optical effect, such as refraction, is not produced at the interface between the first molded portion 11 and the second molded portion 12.

As described previously, the second molded portion 12 is a portion that is formed on the first molded portion (core portion) 11 by performing the injection molding on the first molded portion 11, which serves as a base. Among the interfaces between the first molded portion 11 and the second molded portion 12, an interface that corresponds to the first optical surface 21 is referred to as the first interface 801, an interface that corresponds to the second optical surface 22 is referred to as the second interface 802, and an interface that corresponds to the third optical surface 23 is referred to as the third interface 803, for convenience of description.

As illustrated in FIG. 3A, the thickness of a portion of the second molded portion 12 that corresponds to the first optical surface 21, that is, the distance between the first optical surface 21 and the first interface 801 is denoted by t1. Preferably, the thickness t1 is equal to or larger than 0.5 mm and equal to or smaller than 5.0 mm. Preferably, the thickness t1 may be 2.0 mm. In addition, the thickness of a portion of the second molded portion 12 that corresponds to the second optical surface 22, that is, the distance between the second optical surface 22 and the second interface 802 is denoted by t2. Preferably, the thickness t2 is equal to or larger than 0.5 mm and equal to or smaller than 5.0 mm. Preferably, the thickness t2 may be 2.0 mm. In addition, the thickness of a portion of the second molded portion 12 that corresponds to the third optical surface 23, that is, the distance between the third optical surface 23 and the third interface 803 is denoted by t3. Preferably, the thickness t3 is equal to or larger than 0.5 mm and equal to or smaller than 5.0 mm. Preferably, the thickness t3 may be 2.0 mm. In the present embodiment, the distance between the first optical surface 21 and the first interface 801, the distance between the second optical surface 22 and the second interface 802, and the distance between the third optical surface 23 and the third interface 803 are all 2.0 mm.

As illustrated in FIG. 3B, the first projecting portion 51 is constituted by a portion of the second molded portion 12 and portions of the first molded portion 11, and the portion of the second molded portion 12 is sandwiched between the portions of the first molded portion 11, from both sides. Thus, the first projecting surface 511, which is the top surface of the first projecting portion 51, includes the top surface of the portions of the first molded portion 11 and the top surface of the portion of the second molded portion 12. In addition, the second projecting surface 512, which is the bottom surface of the first projecting portion 51, includes the bottom surface of the portions of the first molded portion 11 and the bottom surface of the portion of the second molded portion 12. The top surface of the portion of the second molded portion 12, which is included in the first projecting surface 511, is located closer to the center of gravity of the optical prism 1 than the bottom surface of the portion of the second molded portion 12 is. The surface area of the top surface of the portion of the second molded portion 12 is larger than the surface area of the bottom surface of the portion of the second molded portion 12. In addition, the top surface of the portion of the second molded portion 12, which is included in the first projecting surface 511, is separated more from the weld than the bottom surface of the portion of the second molded portion 12 is. The surface area of the top surface of the portion of the second molded portion 12 is larger than the surface area of the bottom surface of the portion of the second molded portion 12.

As illustrated in FIG. 6A, in a cross section of the optical prism 1 taken along the C3-C3 line and including the first gate mark 61 and the second gate mark 62, the first projecting portion 51 is included in the second molded portion 12, and the second projecting portion 52 is included in the first molded portion 11. This is because the first molded portion 11 is injection-molded by injecting the resin from the position of the first gate mark 61, and because the second molded portion 12 is injection-molded by injecting the resin from the position of the second gate mark 62.

As illustrated in FIG. 6B, in a cross section of the optical prism 1 taken along the C4-C4 line, the first projecting portion 51 and the second projecting portion 52 are included in the first molded portion 11.

Next, the shape of the first molded portion 11, which is a core (core portion) of the optical prism 1, will be described.

Figure 7A:
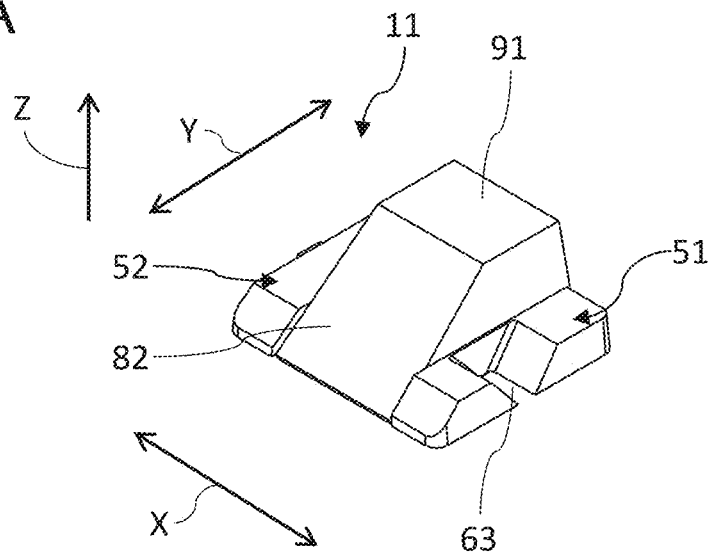
FIG. 7A is a top perspective view of a first molded portion 11 of the present embodiment.
Figure 7B:
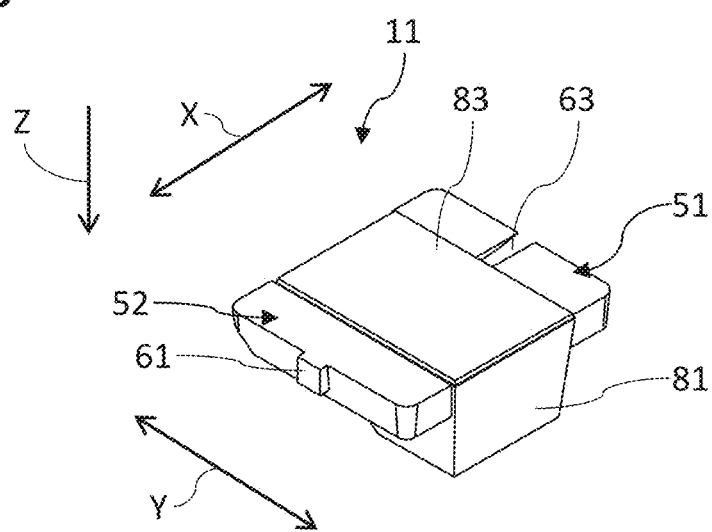
FIG. 7B is a bottom perspective view of the first molded portion 11 of the present embodiment.
Figure 8A:
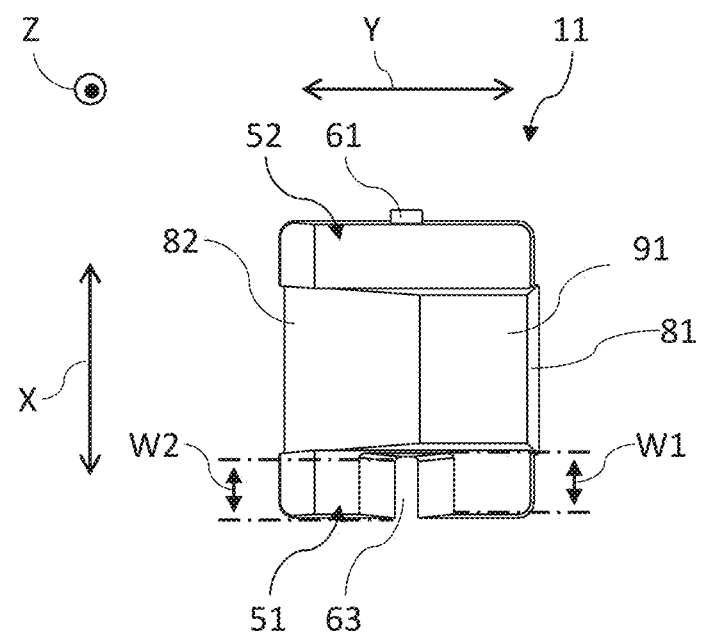
FIG. 8A is a plan view of the first molded portion 11 of the present embodiment.
Figure 8B:
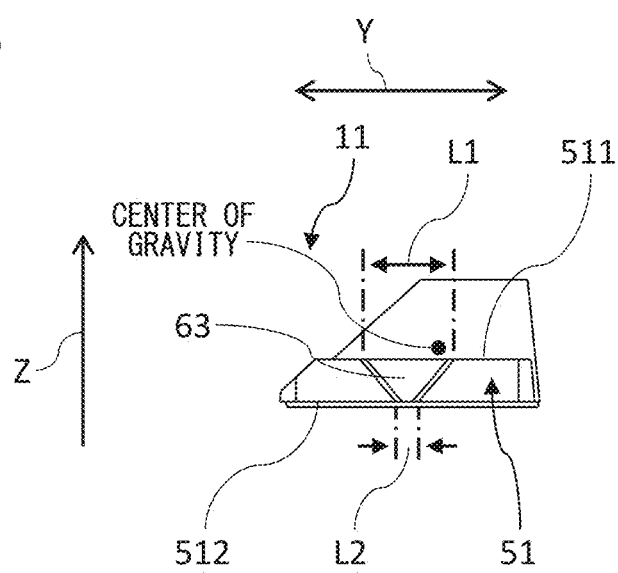
FIG. 8B is a side view of the first molded portion 11 of the present embodiment.

FIGS. 7A and 7B are perspective views of the first molded portion 11 of the present embodiment, viewed from different directions. FIG. 7A is a top perspective view of the first molded portion 11, and FIG. 7B is a bottom perspective view of the first molded portion 11. FIG. 8A is a plan view of the first molded portion 11 of the present embodiment, and FIG. 8B is a side view of the first molded portion 11 of the present embodiment.

A surface 81 of the first molded portion 11 becomes the first interface 801 when the second molded portion 12 is formed. Similarly, a surface 82 of the first molded portion 11 becomes the second interface 802 when the second molded portion 12 is formed, and a surface 83 of the first molded portion 11 becomes the third interface 803 when the second molded portion 12 is formed. In addition, a surface 91 of the first molded portion 11 becomes the base of the first non-optical surface 31 when the second molded portion 12 is formed.

The first molded portion 11 includes the second projecting portion 52 that projects in the X direction. On the second projecting portion 52, the first gate mark 61 is formed. The first gate mark 61 is a mark produced when the first molded portion 11 is injection-molded. The second projecting portion 52 functions as a fixing portion when the first molded portion is set in a mold for injection-molding the second molded portion 12.

The first molded portion 11 includes portions of the first projecting portion 51 that projects in the X direction. The portions of the first projecting portion 51 are formed adjacent to each other at two positions in the Y direction, such that a portion (i.e., a recess portion 63) that does not project in the X direction is sandwiched between the portions of the first projecting portion 51. The two portions of the first projecting portion 51 function as a fixing portion when the first molded portion is set in the mold for injection-molding the second molded portion 12.

The portion that does not project in the X direction and that is sandwiched between the portions of the first projecting portion 51 is referred to as the recess portion 63. The recess portion 63 is a portion that is directly connected with the injection gate when the second molded portion 12 is formed, and that defines the shape of a flow channel of the molten resin. As illustrated in FIG. 8B, when viewed along the projection direction of the first projecting portion 51, the recess portion 63 has the shape of an inverted trapezoid (L1>L2). Since the recess portion 63 has the shape of an inverted trapezoid, the cross section of the flow channel of the molten resin at one side of the recess portion 63 closer to the center of gravity of the optical prism 1 is made larger than the cross section of the flow channel of the molten resin at another side of the recess portion 63 separated more from the center of gravity of the optical prism 1. In this manner, the balance between the flow rate of the resin split in front of the recess portion 63 toward one direction and the flow rate of the resin split in front of the recess portion 63 toward another direction is controlled.

For example, a length L1 of the recess portion 63 on the first projecting surface 511 side is 8.9 mm in the Y direction, a width W1 of the recess portion 63 in the X direction is 5.8 mm, and a projected area of the recess portion 63 viewed from the Z direction is 51.0 mm². In addition, a length L2 of the recess portion 63 on the second projecting surface 512 side is 2.2 mm in the Y direction, a width W2 of the recess portion 63 in the X direction is 5.8 mm, and a projected area of the recess portion 63 viewed from the Z direction is 12.8 mm². Thus, the projected area of the recess portion 63 on the first projecting surface 511 side viewed from the Z direction is four times larger than the projected area of the recess portion 63 on the second projecting surface 512 side. The ratio of the projected area of the recess portion 63 on the first projecting surface 511 side to the projected area of the recess portion 63 on the second projecting surface 512 side has only to be at least 1.5 or more. Preferably, the area ratio is set in accordance with the ratio of the volume of one portion of the second molded portion 12 on the first projecting surface 511 side with respect to the position of the second gate mark 62, to the volume of the other portion of the second molded portion 12 on the second projecting surface 512 side with respect to the position of the second gate mark 62. The second gate mark 62 is the mark of the gate through which the molten resin is injected for forming the second molded portion 12.

In other words, the recess portion 63 is formed such that the area of one opening portion of the recess portion 63 is larger than the area of another opening portion of the recess portion 63. The one opening portion faces a space formed between the first molded portion 11 and a transfer surface of a mold 201 (illustrated in FIG. 12 described below) and having a larger volume. The other opening portion faces a space formed between the first molded portion 11 and a transfer surface of the mold 201 and having a smaller volume. In other words, the recess portion 63 is formed such that the area of one opening portion of the recess portion 63 that faces the center of gravity of the optical prism 1 is larger than the area of another opening portion of the recess portion 63 that faces a direction opposite to a direction that the one opening portion faces.

The recess portion 63 is formed as described above, and the balance between the flow rate of the resin split toward one direction and the flow rate of the resin split toward another direction is controlled when the second molded portion 12 is formed. In this manner, the position at which one portion of the molten resin meets another portion of the molten resin, that is, the position at which the weld is formed can be controlled. The flow of the resin caused when the second molded portion 12 is formed will be specifically described below with reference to FIGS. 15A to 15D, and 16A to 16D.

Method of Manufacturing Optical Prism

Next, a method of manufacturing the optical prism 1 of an embodiment will be described. First, a method of manufacturing the first molded portion 11, which is a core (core portion), will be described; and then, a method of manufacturing the second molded portion 12 will be described.

Method of Manufacturing First Molded Portion 11

Figure 9:
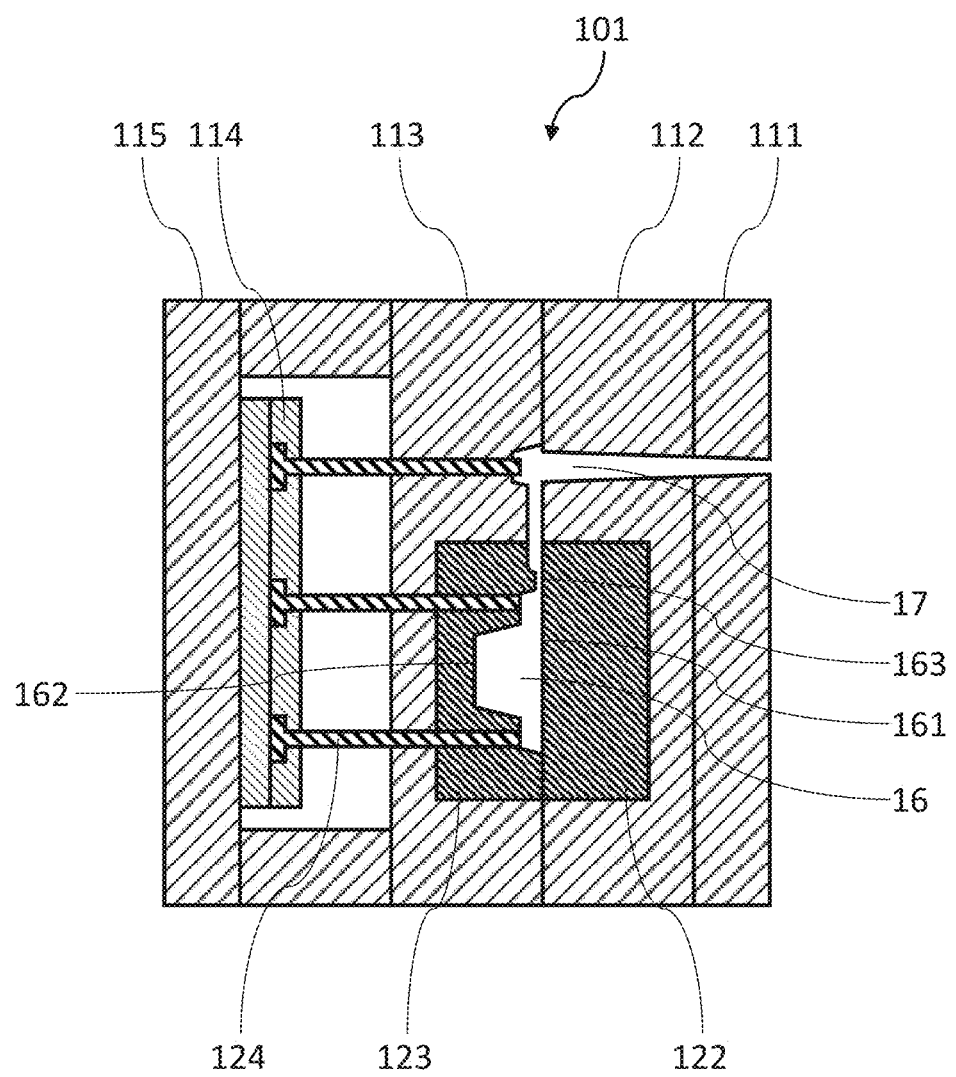
FIG. 9 is a schematic cross-sectional view of a mold 101 used for manufacturing the first molded portion 11.

FIG. 9 is a schematic cross-sectional view for describing a structure of a mold 101 used for manufacturing the first molded portion 11. FIG. 9 illustrates the mold 101 that is closed. In the mold 101, a cavity 16 is defined for forming the first molded portion 11.

The mold 101 includes a fixed attachment plate 111, a fixed mold plate 112, a movable mold plate 113, an ejector plate 114, and a movable attachment plate 115. The fixed attachment plate 111, the fixed mold plate 112, and the movable mold plate 113 define a runner space 17.

The fixed mold plate 112 includes a fixed core 122. The movable mold plate 113 includes a movable core 123. The fixed core 122 includes a first forming surface 161 that forms the surface 83 of the first molded portion 11 and the second projecting surface 512 through transfer. The movable core 123 includes a first forming surface 162 that forms the surfaces 81 and 82 of the first molded portion 11, the first projecting surface 511, and the recess portion 63. The ejector plate 114 includes a plurality of ejector pins 124, and the leading ends of the ejector pins 124 are exposed to the cavity 16 and the runner space 17. The molten resin is injected from the runner space 17 into the cavity 16 through a first gate 163.

Figure 10A:
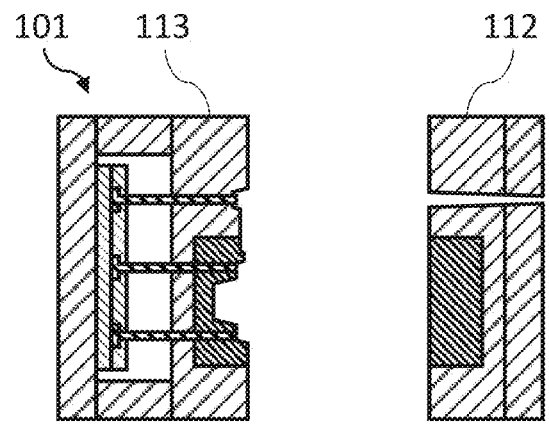
FIG. 10A is a diagram illustrating a state where the mold 101 is opened.

Next, a procedure of manufacturing the first molded portion 11 by using the mold 101 will be described with reference to FIGS. 10A to 10C and 11A to 11C. First, as illustrated in FIG. 10A, the molding is started in a state where the mold 101 is opened.

Figure 10B:
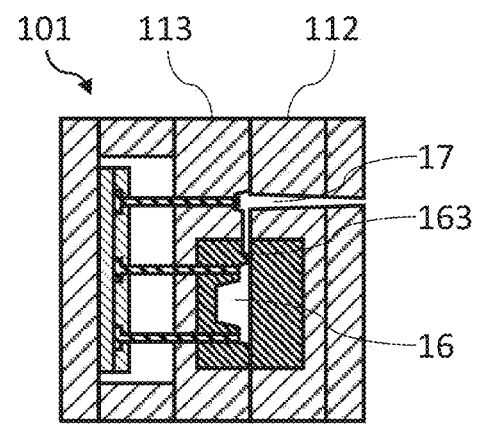
FIG. 10B is a diagram illustrating a mold closing process of the mold 101.

Then, in a mold closing process illustrated in FIG. 10B, the mold 101 is closed. When the mold 101 is closed, the fixed mold plate 112 and the movable mold plate 113 abut against each other, and the cavity 16 and the runner space 17 are defined in the mold 101.

Figure 10C:
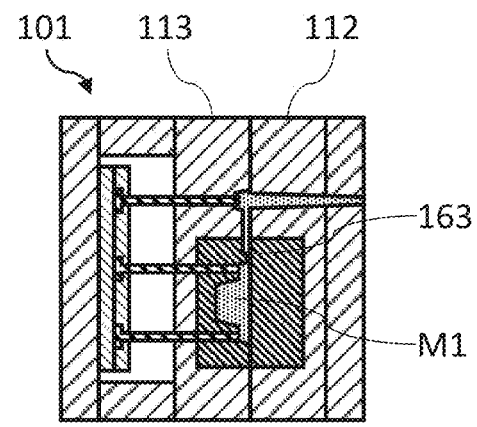
FIG. 10C is a diagram illustrating an injection process of the mold 101.

Then, in an injection process illustrated in FIG. 10C, molten resin M1 is injected by an injection molding machine (not illustrated) into the cavity 16 through the runner space 17 and the first gate 163.

Figure 11A:
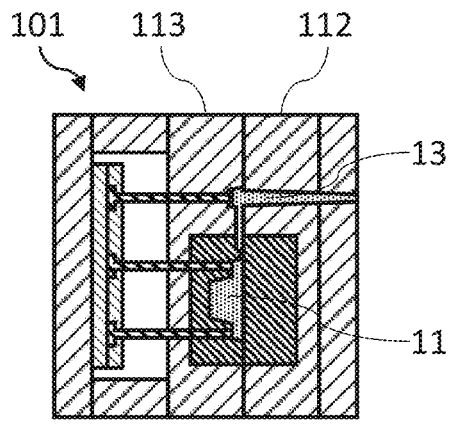
FIG. 11A is a diagram illustrating a cooling process of the mold 101.

Then, in a cooling process illustrated in FIG. 11A, the temperature of the mold 101 is set at a temperature lower than the melting temperature of the resin. Thus, the molten resin M1 is cooled and solidified, so that the first molded portion 11 and a runner 13 are formed. The mold 101 may have a water-cooling system. In this case, the mold is cooled to a predetermined temperature by water.

Figure 11B:
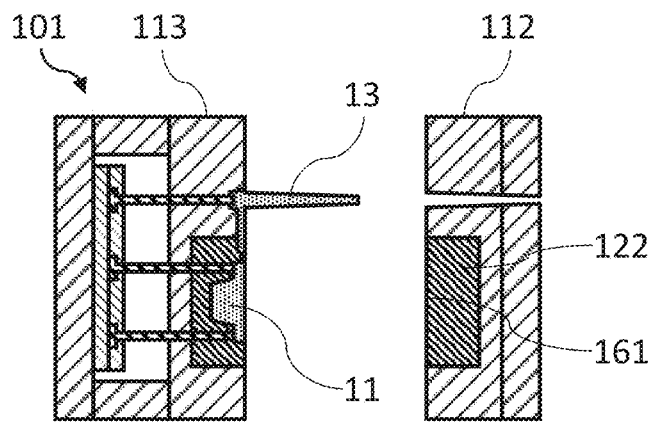
FIG. 11B is a diagram illustrating a mold opening process of the mold 101.

After the first molded portion 11 is cooled sufficiently, the mold 101 is opened in a mold opening process illustrated in FIG. 11B. When the mold 101 is opened, the first molded portion 11 is separated from the first forming surface 161 of the fixed core 122.

Figure 11C:
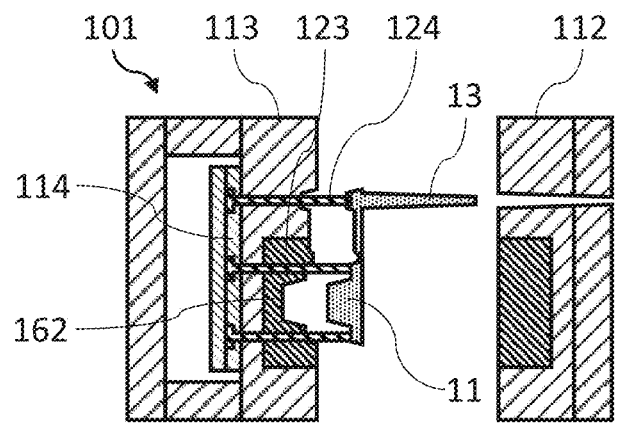
FIG. 11C is a diagram illustrating a mold separating process of the mold 101.

Then, in a mold separating process illustrated in FIG. 11C, the ejector plate 114 is moved forward toward the movable core 123, and the ejector pins 124 are projected from the movable core 123, so that the first molded portion 11 is separated from the first forming surface 162 of the movable core 123. In this manner, the first molded portion 11 and the runner 13 are separated from the mold 101. After that, in a gate-cut process, the runner 13 is separated from the first molded portion 11. When the runner 13 is separated from the first molded portion 11, the first gate mark 61 is formed on the first molded portion 11. The first molded portion 11 is manufactured in the above-described manner.

Method of Manufacturing Second Molded Portion 12

Figure 12:
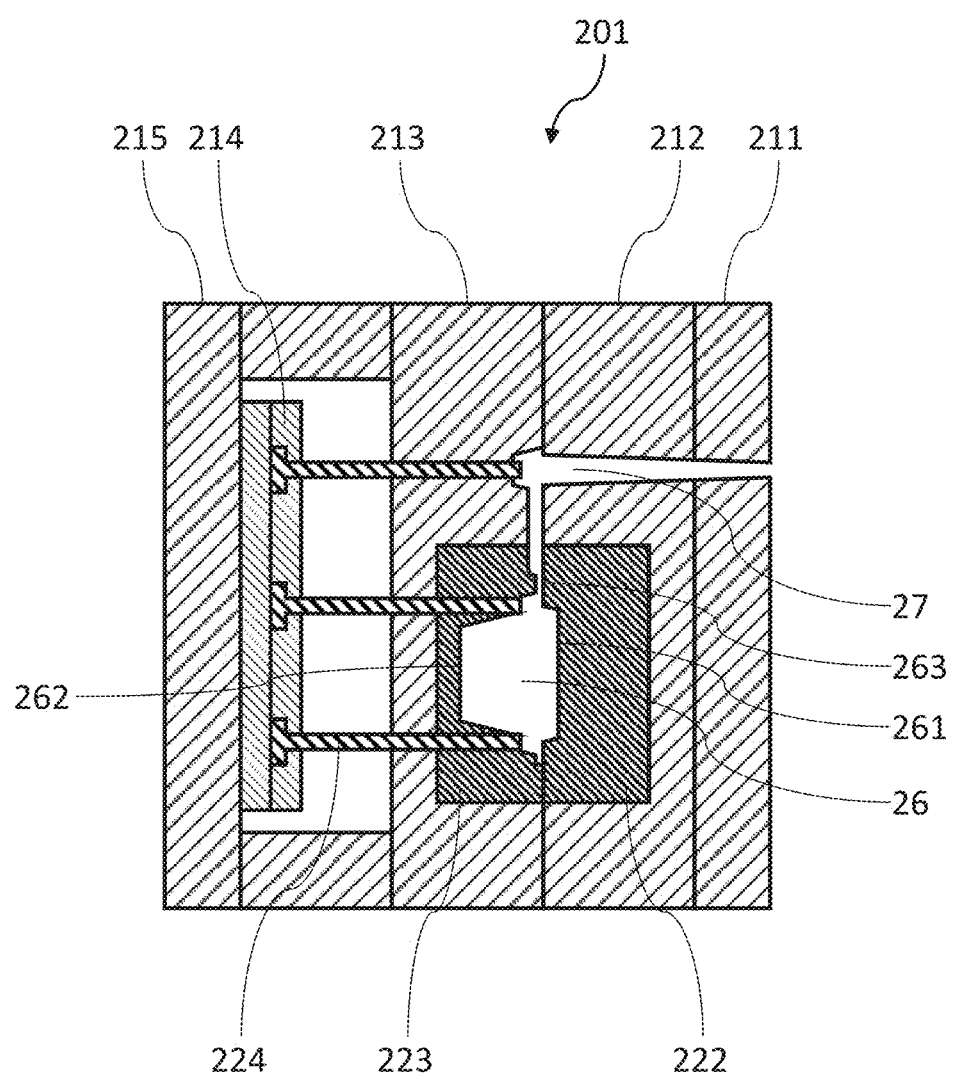
FIG. 12 is a schematic cross-sectional view of a mold 201 used for manufacturing a second molded portion 12.

FIG. 12 is a schematic cross-sectional view for describing a structure of a mold 201 used for manufacturing the second molded portion 12. FIG. 12 illustrates the mold 201 that is closed. In the mold 201, a cavity 26 is defined for forming the outer shape of the second molded portion 12. Note that FIG. 12 illustrates the mold 201 that is closed in a state where the first molded portion 11 is not inserted in the cavity 26.

The mold 201 includes a fixed attachment plate 211, a fixed mold plate 212, a movable mold plate 213, an ejector plate 214, and a movable attachment plate 215. The fixed attachment plate 211, the fixed mold plate 212, and the movable mold plate 213 define a runner space 27. The fixed mold plate 212 includes a fixed core 222. The movable mold plate 213 includes a movable core 223. The fixed core 222 includes a second forming surface 261 that forms the third optical surface 23 through transfer. The movable core 223 includes a second forming surface 262 that forms the first optical surface 21 and the second optical surface 22 through transfer. The ejector plate 214 includes a plurality of ejector pins 224, and the leading ends of the ejector pins 224 are exposed to the cavity 26 and the runner space 27. The molten resin is injected from the runner space 27 into the cavity 26 through a second gate 263.

Figure 13A:
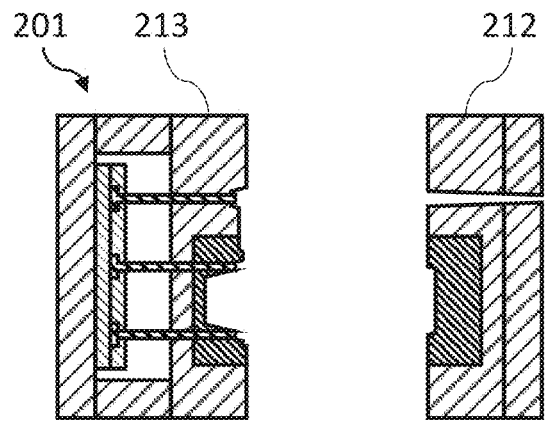
FIG. 13A is a diagram illustrating a state where the mold 201 is opened.

Next, a procedure of manufacturing the second molded portion 12 by using the mold 201 will be described with reference to FIGS. 13A to 13C, 14, 15A to 15D, 16A to 16D, and 17A to 17C. First, as illustrated in FIG. 13A, the molding is started in a state where the mold 201 is opened.

Figure 13B:
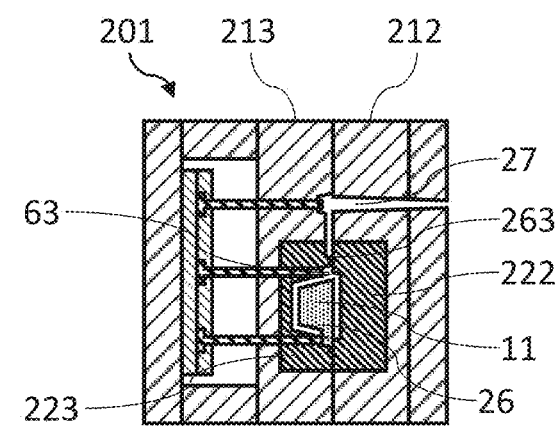
FIG. 13B is a diagram illustrating a mold closing process of the mold 201.

Then, a mold closing process illustrated in FIG. 13B is performed. In the mold closing process, the temperature of the first molded portion 11, which has been molded, is increased to a temperature near to the temperature of the mold 201, and then the first molded portion 11 is disposed at a predetermined position in the cavity 26 (that is, inserted into the cavity 26), in a state where the mold 201 is opened. The first molded portion 11 is disposed at the predetermined position in the cavity 26 such that the recess portion 63 of the first molded portion 11 and the second gate 263 of the mold 201 overlap with each other. After that, the mold 201 is closed. When the mold 201 is closed, the fixed mold plate 212 and the movable mold plate 213 abut against each other, and the cavity 26 and the runner space 27 are defined in the mold 201. Since the first projecting portion 51 and the second projecting portion 52 of the first molded portion 11 are sandwiched between the fixed core 222 and the movable core 223, the first molded portion 11 that has been inserted into the cavity 26 is accurately positioned and fixed in the cavity 26.

Figure 13C:
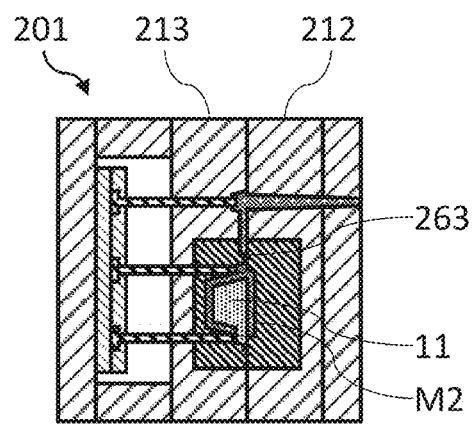
FIG. 13C is a diagram illustrating an injection process of the mold 201.

Then, in an injection process illustrated in FIG. 13C, molten resin M2 is injected by an injection molding machine (not illustrated) into the cavity 26 through the runner space 27 and the second gate 263. In the present embodiment, the material of the molten resin M1 used for forming the first molded portion 11 and the material of the molten resin M2 used for forming the second molded portion 12 are identical to each other.

Figure 14:
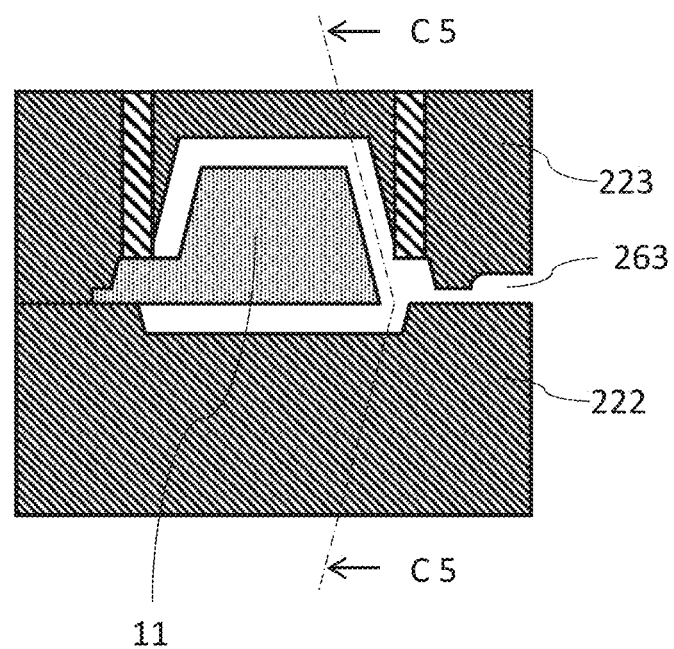
FIG. 14 is a diagram illustrating a cross section of the mold 201 in which the first molded portion 11 is inserted.
Figure 15A:
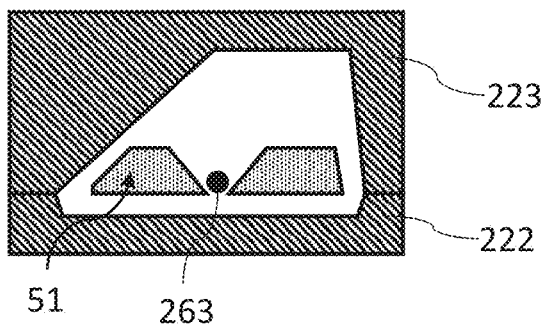
FIG. 15A is a diagram illustrating a cross section taken along a C5-C5 line of FIG. 14.

Hereinafter, the flow of the resin for forming the second molded portion will be described. FIG. 14 is a cross-sectional view of the mold 201 in which the first molded portion 11 is inserted. The cross-sectional view of the mold 201 is obtained by cutting the mold 201 along an XZ plane at a position at which the second gate 263 is formed. In other words, the cross-sectional view of the mold 201 is obtained by cutting the mold 201 along the C3-C3 line of FIG. 2A, which is defined for the injection-molded optical prism 1. FIG. 15A illustrates a cross section taken along a C5-C5 line of FIG. 14.

As illustrated in FIG. 14, the cavity 26 includes an upper space and a lower space that are to be filled with the molten resin. The upper space is formed above the first projecting portion 51, and the lower space is formed below the first projecting portion 51. As illustrated in FIG. 15A, the upper space and the lower space connect to each other at a position outside the first projecting portion 51 with respect to the second gate 263.

Hereinafter, with reference to FIGS. 15B to 15D, and 16A to 16D, the description will be made for how the flow of the molten resin, injected from the second gate 263, changes with time. Each of FIGS. 15B to 15D illustrates a cross section taken along the line C5-C5 of FIG. 14, and each of FIGS. 16A to 16D is a schematic perspective diagram in which the interior of the cavity is viewed from obliquely above.

Figure 15B:
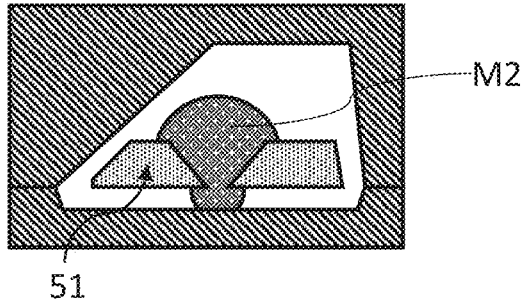
FIG. 15B is a cross-sectional view illustrating a state where molten resin M2 is split upward and downward and flows around the first molded portion 11.
Figure 15C:
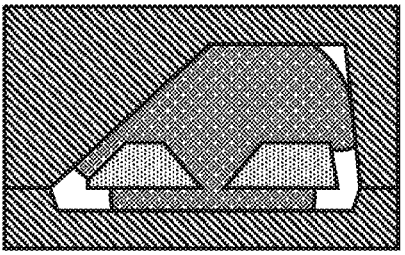
FIG. 15C is a diagram illustrating a state where the molten resin M2 is split and flows so that a space is filled with the molten resin M2.
Figure 16A:
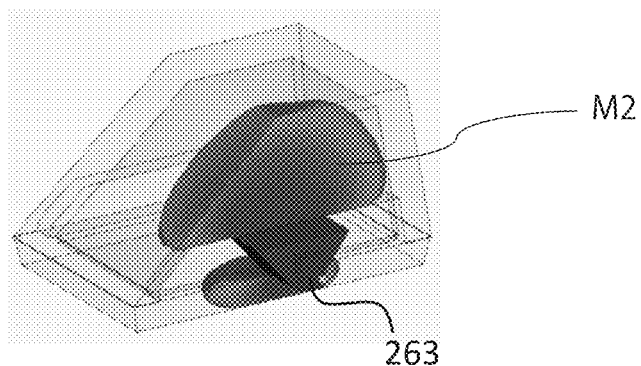
FIG. 16A is a perspective diagram illustrating a state where the molten resin M2 is split upward and downward and flows around the first molded portion 11.
Figure 16B:
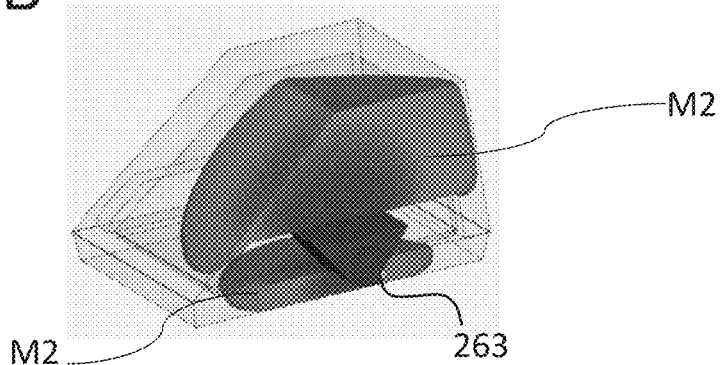
FIG. 16B is a diagram illustrating a state where the molten resin M2 is split and flows so that a space is filled with the molten resin M2.

When the injection of the molten resin from the second gate 263, which is positioned at the recess portion 63 of the first molded portion 11, is started, the molten resin M2 is split upward and downward and flows around the first molded portion 11, as illustrated in FIGS. 15B and 16A, filling the upper space and the lower space.

As described previously, the center of gravity of the optical prism 1 is positioned above the position of the second gate 263 (or the recess portion 63). Thus, the volume of the upper space to be filled with the molten resin M2 is larger than the volume of the lower space to be filled with the molten resin M2. In the present embodiment, the cross section of the flow channel of the molten resin M2 that flows in the recess portion 63 is made larger on the side of the flow channel closer to the center of gravity of the optical prism 1, than on the side of the flow channel separated more from the center of gravity of the optical prism 1. Thus, the cross-sectional area of a flow channel of the resin that flows from the recess portion 63 toward the upper space is larger than the cross-sectional area of a flow channel of the resin that flows from the recess portion 63 toward the lower space. As a result, in the present embodiment, the flow rate of the resin that is split and flows from the recess portion 63 to the upper space becomes larger than the flow rate of the resin that is split and flows from the recess portion 63 to the lower space. The cavity is filled with the molten resin in time series, in the order of FIG. 15B, FIG. 15C, and FIG. 15D, or in the order of FIG. 16A, FIG. 16B, FIG. 16C, and FIG. 16D.

Figure 15D:
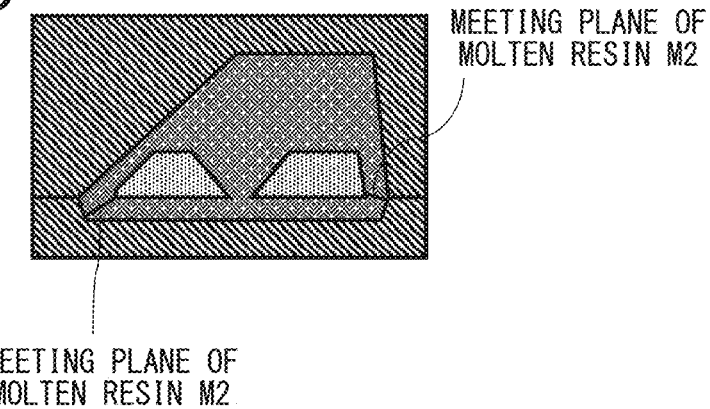
FIG. 15D is a diagram illustrating a state where a leading edge of one portion of the molten resin M2 that has been split meets a leading edge of another portion of the molten resin M2 that has been split.
Figure 16C:
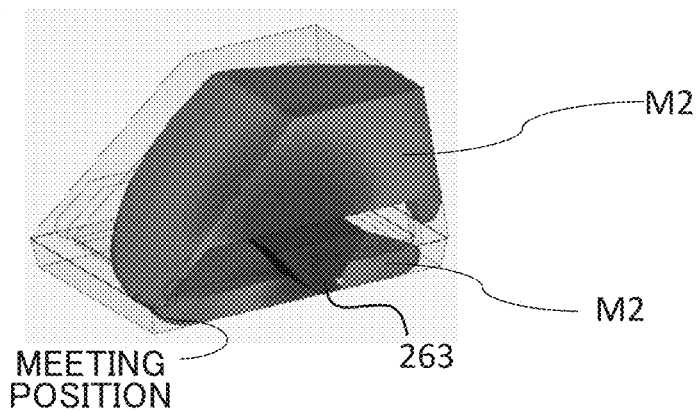
FIG. 16C is a diagram illustrating a state where a leading edge of one portion of the molten resin M2 that has been split meets a leading edge of another portion of the molten resin M2 that has been split.
Figure 16D:
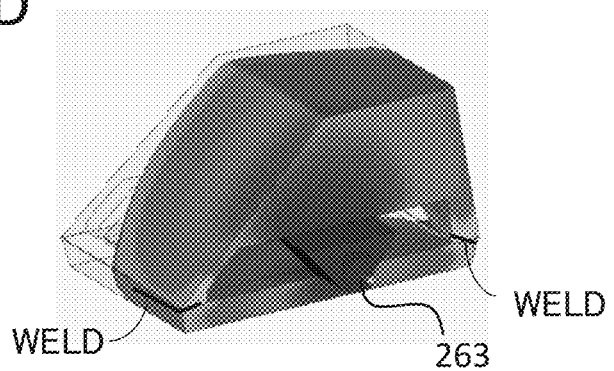
FIG. 16D is a diagram illustrating a state where a leading edge of one portion of the molten resin M2 that has been split meets a leading edge of another portion of the molten resin M2 that has been split.

As the filling proceeds, the leading edge of one portion of the molten resin M2 that has been split toward the upper space and the leading edge of another portion of the molten resin M2 that has been split toward the lower space meet with each other, as illustrated in FIG. 15D or FIGS. 16C and 16D. The leading edges of the molten resin M2 first meet with each other at a position near to the first projecting portion 51, and the meeting point gradually moves toward the second projecting portion 52. The weld is formed along the track of the meeting point. As the meeting point moves closer to the second projecting portion 52, the angle at which the leading edges of the molten resin M2 meet with each other decreases, causing one portion of the molten resin and another portion of the molten resin to join with each other more easily. It becomes more difficult for the weld to be formed as the meeting point moves closer to the second projecting portion 52. Thus, as illustrated in FIGS. 1A and 1B, the welds 71 and 72 are formed only on the side closer to the first projecting portion 51 in the X direction.

Figure 17A:
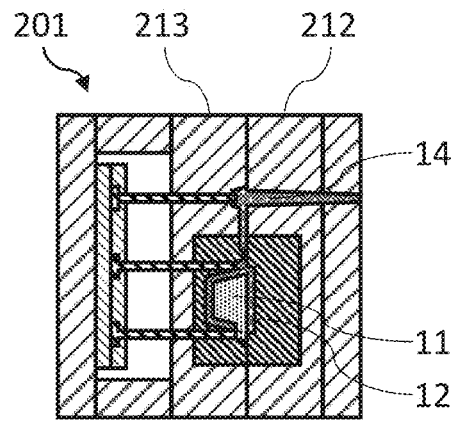
FIG. 17A is a diagram illustrating a cooling process of the mold 201.

After the cavity is filled with the molten resin M2 in the injection process illustrated in FIG. 13C, a cooling process illustrated in FIG. 17A is performed. In the cooling process, the temperature of the mold 201 is set at a temperature lower than the solidifying temperature of the resin. Thus, the molten resin M2 is cooled and solidified, so that the second molded portion 12 and a runner 14 are formed. The mold 201 may have a water-cooling system. In this case, the mold is cooled to a predetermined temperature by water.

Figure 17B:
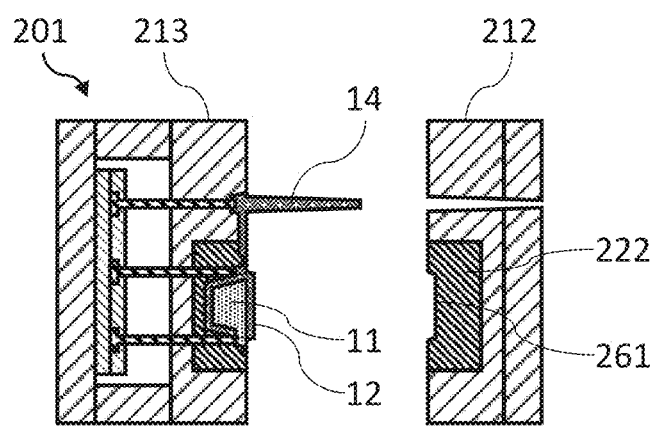
FIG. 17B is a diagram illustrating a mold opening process of the mold 201.

After the second molded portion 12 is cooled sufficiently, the mold 201 is opened in a mold opening process illustrated in FIG. 17B. When the mold 201 is opened, the second molded portion 12 is separated from the second forming surface 261 of the fixed core 222.

Figure 17C:
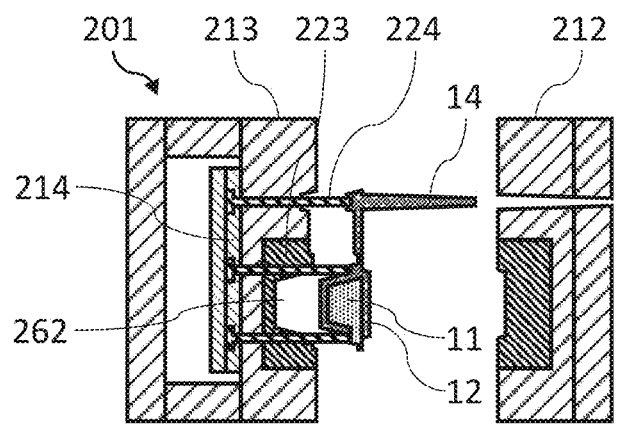
FIG. 17C is a diagram illustrating a mold separating process of the mold 201.

Then, in a mold separating process illustrated in FIG. 17C, the ejector plate 214 is moved forward toward the movable core 223, and the ejector pins 224 are projected from the movable core 223, so that the second molded portion 12 is separated from the second forming surface 262 of the movable core 223. In this manner, the second molded portion 12 integrated with the first molded portion 11, and the runner 14 are separated from the mold 201.

After that, in a gate-cut process, the runner 14 is separated from the second molded portion 12. When the runner 14 is separated from the second molded portion 12, the second gate mark 62 is formed on the second molded portion 12. The optical prism 1 of the present embodiment is manufactured in the above-described manner.

In the present embodiment, for forming the optical prism 1, the first molded portion 11 is injection-molded, and then the first molded portion 11 is inserted into another mold and the second molded portion 12 is injection-molded. Since the first molded portion 11 and the second molded portion 12 are injection-molded separately, the thickness of a resin body formed in one molding cycle can be made smaller. If a significant temperature distribution is produced in a resin body when the molten resin is cooled and solidified, the strain will remain in the optical prism. In the present embodiment, however, since the optical prism is injection-molded in at least two stages (the total volume is divided into at least two volumes), the temperature distribution can be made smaller. As a result, the internal strain of the optical prism can be reduced, compared with the internal strain of an optical prism, the whole of which is molded in one stage. In addition, compared with the method disclosed in Japanese Patent Application Publication No. 2001-353761, the method of the present embodiment can shorten the molding cycle. Thus, optical prisms having excellent optical property can be manufactured with high mass productivity.

In the present embodiment, the first molded portion 11 is formed so that the thickness or volume of the optical prism is divided into the thickness or volume of the first molded portion 11 and the thickness or volume of the second molded portion 12, based on the total shape or the total volume of the optical prism. In addition, the shape of the first molded portion 11 is determined for controlling the position at which the weld is formed when the second molded portion 12 is injection-molded. The position at which one portion of the molten resin that has been split in the injection molding of the second molded portion 12 and another portion of the molten resin that has been split in the injection molding of the second molded portion 12 meet with each other, that is, the position at which the weld is formed is set in advance so that the position is out of the optical-surface effective area (preferably, in a non-optical surface) in the whole shape of the optical prism. In addition, the shape of the recess portion 63 of the first molded portion 11 is set in accordance with the volume of each channel of the flow from the position at which the molten resin is split, to the preset position at which one portion of the molten resin and another portion of the molten resin meet with each other. Thus, one portion of the molten resin and another portion of the molten resin are caused to meet with each other at a preset meeting position, by using the shape effect of the recess portion 63 and by adjusting the flow rate of the molten resin that is split and injected into each channel. Thus, in the present embodiment, the position at which the weld is formed can be set at a position that optically causes no adverse effect. As a result, optical prisms having excellent optical property can be mass-produced at high yield (low cost).

Modifications

The optical prism of the present invention is not limited to the above-described embodiments, and can be variously modified within the technical concept of the present invention.

In the above-described embodiments, the material of the molten resin M1 used for forming the first molded portion 11 and the material of the molten resin M2 used for forming the second molded portion 12 are identical to each other for preventing the refraction and reflection from occurring at the interface between the first molded portion 11 and the second molded portion 12. However, the embodiments of the present invention are not limited to this, and the material of the molten resin M1 and the material of the molten resin M2 may be different from each other. In this case, it is preferable that the combination of a resin used for forming the first molded portion 11 and a resin used for forming the second molded portion 12 be selected in consideration of mutual solubility of the resins.

In addition, although the description has been made, in the above-described embodiments, for the optical prism 1 that includes three optical surfaces, the number of optical surfaces is not limited to this. For example, the optical prism may include two optical surfaces, or may include four or more optical surfaces. Preferably, all the optical surfaces are formed in the second molded portion 12 in consideration of the shape accuracy of the optical surfaces. However, depending on the specifications of an optical prism, all the optical surfaces of the optical prism may not necessarily be formed in the second molded portion 12.

In the above-described embodiments, the thickness of a portion (that corresponds to an optical surface) of the second molded portion, that is, the distance from an optical surface to the interface between the first molded portion and the second molded portion is 2 mm. However, the present disclosure is not limited to the numerical value. However, in consideration of the shape accuracy of the optical surface, the distance from the optical surface to the first molded portion, that is, the thickness of a portion (that corresponds to an optical surface) of the second molded portion is preferably equal to or larger than 0.5 mm and equal to or smaller than 5 mm. Note that the thickness of one portion (that corresponds to one optical surface) of the second molded portion may not be equal to the thickness of another portion (that corresponds to another optical surface) of the second molded portion. In addition, the thickness of a portion (that corresponds to an optical surface) of the second molded portion may not be constant at all positions. However, it is preferable in consideration of the shape accuracy of the optical surface, that the ratio of the maximum value to the minimum value of the thickness of a portion (that corresponds to an optical surface) of the second molded portion be equal to or smaller than 2. The optical surfaces may not necessarily be flat surfaces. For example, the optical surfaces may be a combination of curved surfaces, such as a spherical surface and a non-spherical surface, which are determined in accordance with the use of the optical prism. For example, the optical prism may be a prism including three surfaces; the first optical surface may be a free-form surface, and the second and the third optical surfaces may be flat surfaces. In addition, the non-optical surfaces may also be flat surfaces, curved surfaces, or a combination of flat surfaces and curved surfaces.

Optical Apparatus Including Optical Prism

As one example of optical apparatuses that include the above-described optical prism and that are of the present embodiment, a head mounted display (hereinafter, referred to as an HMD) will be described. Note that in the following description, a final letter L of a reference symbol indicates that the component denoted by the reference symbol is used in an optical unit for the left eye, and a final letter R of a reference symbol indicates that the component denoted by the reference symbol is used in an optical unit for the right eye.

Figure 18A:
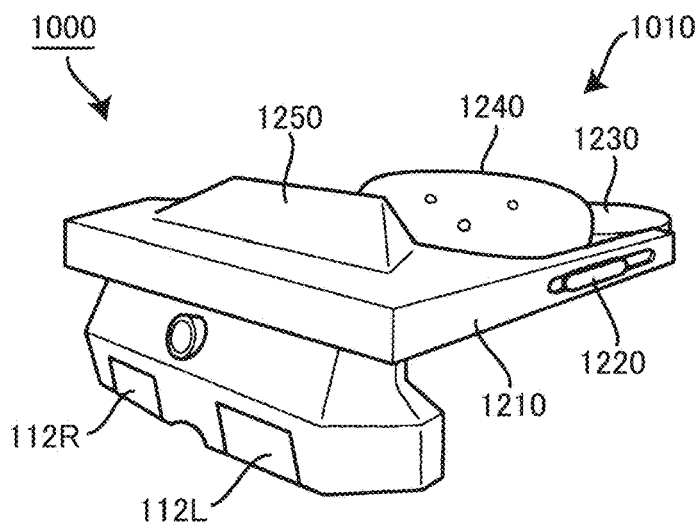
FIG. 18A is a perspective view of an external appearance of an HMD 1000 of an embodiment.
Figure 18B:
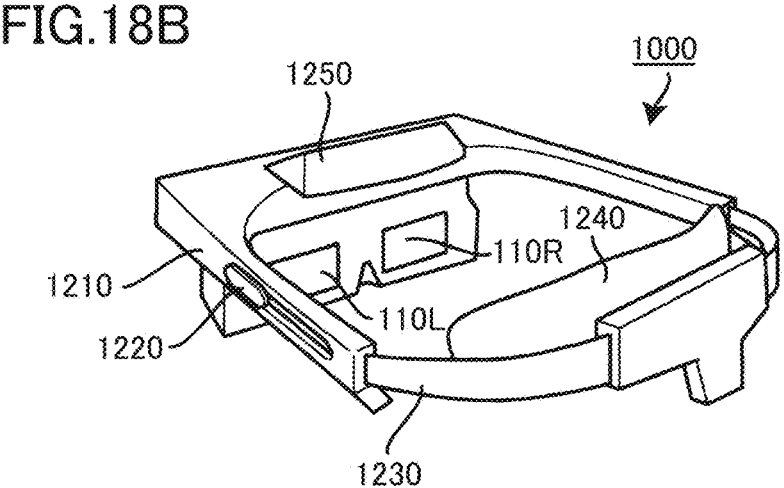
FIG. 18B is a perspective view of an external appearance of the HMD 1000 of an embodiment, in which the HMD 1000 is viewed from a different direction.
Figure 18C:
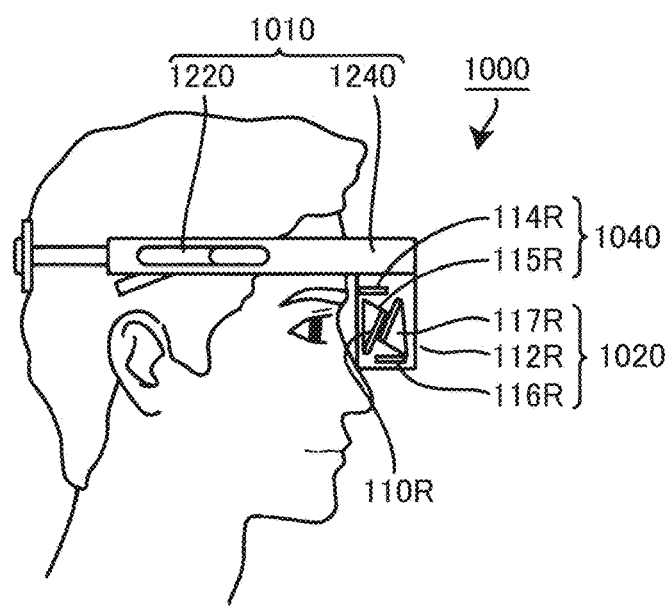
FIG. 18C is a schematic diagram illustrating the HMD 1000 of an embodiment, mounted on a user.

FIGS. 18A and 18B are perspective views of external appearances of an HMD 1000 of the present embodiment, viewed from different directions. FIG. 18C is a schematic diagram illustrating a state where the HMD 1000 is mounted on a user. In FIG. 18C, an optical mechanism corresponding to the right eye is illustrated. Although an optical mechanism corresponding to the left eye is not illustrated, the optical mechanism corresponding to the left eye is disposed, and is provided with a reference numeral whose final letter is L.

The HMD 1000 includes a head mounted portion 1010, an image pickup portion 1020, and a display portion 1040. The head mounted portion 1010 is used for mounting the HMD 1000 on the head of a user. The image pickup portion 1020 captures the image of a scene that is in front of the head of a user. The display portion 1040 displays graphics.

The head mounted portion 1010, which is used for mounting the HMD 1000 of the present embodiment on the head of a user, includes a side-head mounted portion 1210, an adjuster 1220, a length adjustment portion 1230, a back-head mounted portion 1240, and a forehead mounted portion 1250.

For mounting the HMD 1000 on the head of a user, the user first loosens the length adjustment portion 1230 by using the adjuster 1220, and puts the HMD 1000 on the head of the user. Then, the user brings the forehead mounted portion 1250 into close contact with the forehead, and tightens the length adjustment portion 1230 by using the adjuster 1220 so that the side-head mounted portion 1210 is in close contact with the side heads, and that the back-head mounted portion 1240 is in close contact with the back head. Note that the head mounted portion 1010 may not be the goggles type illustrated in FIGS. 18A to 18C, and may be an eyeglasses-frame type or a helmet type.

The image pickup portion 1020 is a so-called digital camera, and includes incidence windows 112L and 112R, image pickup sensors 116L and 116R, and optical prisms 117L and 117R of the above-described embodiments. The image pickup portion 1020 captures an image of a scene in a direction (that corresponds to a field of vision of the user) that is almost equal to a direction toward which the head of the user faces (the HMD 1000 of the present embodiment is being mounted on the head of the user). Specifically, the light from the outside of the HMD 1000 enters the HMD 1000 through the incidence windows 112L and 112R, and is guided by the optical prisms 117L and 117R into the interior of the HMD 1000, and received by the image pickup sensors 116L and 116R. In this manner, an image of a scene is captured by the image pickup sensors 116L and 116R. The optical prisms 117L and 117R of the present embodiment are positioned and fixed to the housing (that is a support member that supports the optical prisms) of the HMD 1000 such that the first projecting portion 51 and the second projecting portion 52, which serve as fixing portions, are positioned and fixed to the housing.

The display portion 1040 includes screens 110L and 110B, color liquid-crystal displays 114L and 114R, and optical prisms 115L and 115R of the above-described embodiments. The display portion 1040 is placed at a position at which eye-glass lenses would be placed, so that the display portion 1040 faces the eyes of a user. Specifically, images displayed by the color liquid-crystal displays 114L and 114R are guided by the optical prisms 115L and 115B, and are displayed on the screens 110L and 110R. The optical prisms 115L and 115R of the present embodiment are positioned and fixed to a housing of the HMD 1000 such that the first projecting portion 51 and the second projecting portion 52, which serve as fixing portions, are positioned and fixed to the housing.

If the HMD 1000 is a video see-through type, the screens 110L and 110R do not have transparency in principle. In this case, the screens 110L and 110R directly display images produced from the color liquid-crystal displays 114L and 114R and guided by the optical prisms 115L and 115R. In contrast, if the HMD 1000 is a glass see-through type, the screens 110L and 110R are so-called half-mirrors. That is, the screens 110L and 110R has transparency to some extent, and a user can optically see a scene of the real space. While the user optically sees a scene of the real space, the display light of graphics produced from the color liquid-crystal displays 114L and 114R and guided by the optical prisms 115L and 115R is reflected by mirrors toward the eyes of the user. The mirrors are mounted on a front surface or a back surface, or in the interior of the HMD 1000. That is, in the glass see-through type, an image of a scene of the real space and an image (graphics) of a virtual object are optically superimposed on each other on the screens 110L and 110R.

The optical axis of the light outgoing from the optical prisms 115L and 115R of the display portion 1040, and the optical axis of the light incident to the optical prisms 117L and 117R of the image pickup portion 1020 are equal to the optical axis of the eyes of a user. The image pickup sensors 116L and 116R capture an image of a scene of the real space, obtained at the position of a user in a direction toward which the head of the user faces.

In the HMD of the video see-through type, the color liquid-crystal displays 114L and 114R display an image in which an image of a scene of the real space captured by the image pickup sensors 116L and 116R and an image (graphics) of a virtual object are electrically superimposed on each other (image composition). In contrast, in the HMD of the glass see-through type, the color liquid-crystal displays 114L and 114R display only an image (graphics) of a virtual object, in principle.

Figure 19A:
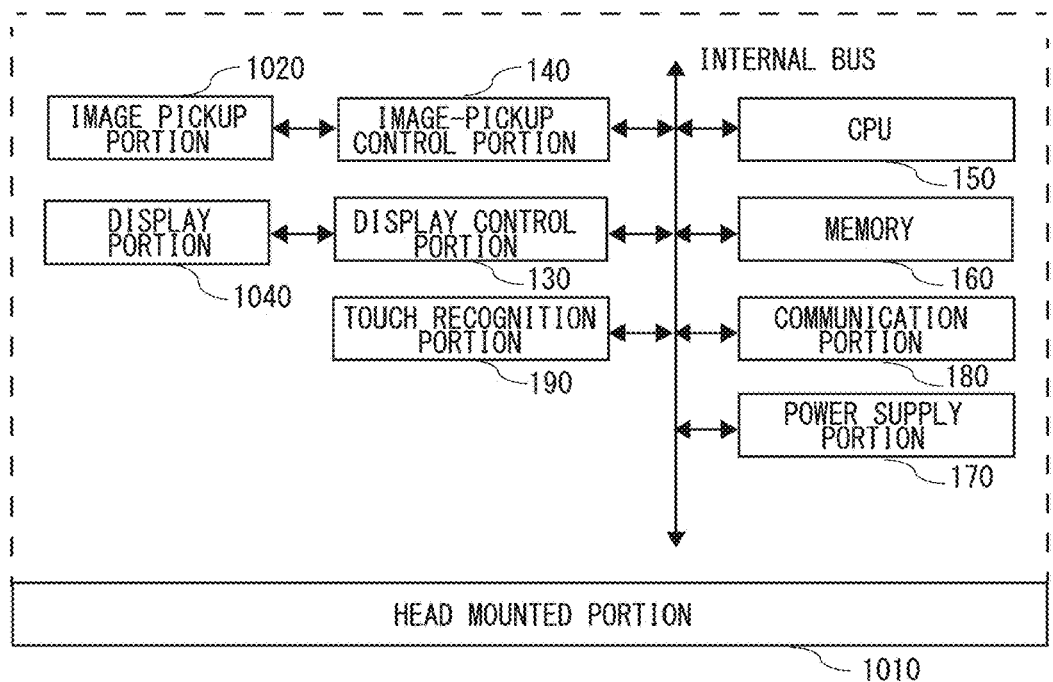
FIG. 19A is a block diagram illustrating a configuration of the HMD 1000 of an embodiment.

FIG. 19A is a block diagram illustrating a configuration of the HMD 1000 of the present embodiment, as an example. The HMD 1000 further includes a display control portion 130, an image-pickup control portion 140, a CPU 150, a memory 160, a power supply portion 170, a communication portion 180, and a touch recognition portion 190, which are mounted in the main body that includes the head mounted portion 1010, and which are not illustrated in FIGS. 18A to 18C.

The display control portion 130 performs the display control of the display portion 1040. For example, the display control portion 130 controls the size, position, orientation, color, and transparency of an image (graphics) of a virtual object, which is superimposed on an image of a scene of the real space and displayed (image composition). In addition, the display control portion 130 controls the movement and brightness of an image of a virtual object if an image of a scene of the real space changes. For example, the image of a virtual object contains an image of a graphical user interface or an image of a keyboard. The image of a graphical user interface may be an image of a menu used for inputting an instruction from a user.

The image-pickup control portion 140 controls the exposure and the distance measuring, based on results of a predetermined computing process performed by using the data of a captured image. Under the control performed by the image-pickup control portion 140, an automatic focus (AF) process, an automatic exposure (AE) process, an automatic white balance (AWB) process, and the like are performed. If the image pickup portion 1020 includes a mechanism to put or remove an optical filter on or from the optical path, and an anti-vibration mechanism, the image-pickup control portion 140 controls putting or removing an optical filter on or from the optical path, and the anti-vibration mechanism, depending on the data of a captured image and other conditions.

The CPU 150 performs a computing process for the whole of the HMD 1000. The CPU 150 performs each of processes of the present embodiment by executing a program stored in the below-described memory 160. The memory 160 includes a work area and a nonvolatile area. In the work area of the memory 160, a program having been read from the nonvolatile area, and constants and variables used for controlling the system are developed. In addition, the data of an image (graphics) of a virtual object, which image is to be superimposed on an image of a scene of the real space and displayed, is stored in the memory 160 for displaying the image. In addition, the A/D-converted data of an image captured by the image pickup portion 1020 is stored in the memory 160 for performing the image analysis and image processing.

The power supply portion 170 includes a primary battery, such as an alkaline battery or a lithium battery, a secondary battery, such as an NiCd battery, an NiMH battery, or a Li battery, or an AC adapter; and supplies electric power to the whole of the HMD 1000. The power supply portion 170 also includes a power switch that turns on and off the power under the operation of a user or other conditions. The communication portion 180 communicates with an information terminal, such as a PC, or a network, such as a LAN or the Internet, depending on the control performed by the CPU 150.

The touch recognition portion 190 recognizes a touch operation performed by a user on a real object. The touch recognition portion 190 is achieved by software. For example, the touch recognition portion 190 is achieved by the CPU 150 performing a computation process on an image captured by the image pickup portion 1020, depending on a touch recognition program stored in the memory 160. If the touch recognition portion 190 is achieved by using a method that measures the change in capacitance, the touch recognition portion 190 includes a capacitance measuring instrument or the like.

The HMD 1000 of the present embodiment includes the optical prisms 115L, 115R, 117L, and 117R of the above-described embodiments. Since the optical prisms have less internal strain and welds formed out of the optical-surface effective area, the HMD 1000 can capture and display a high-quality image. Note that the number and arrangement of the optical prisms of the above-described embodiments are not limited to those of the example of the HMD 1000 illustrated in the figures, and can be modified as appropriate.

System Including Optical Apparatus

Hereinafter, a mixed reality (MR) system that includes the video see-through type HMD 1000 of the above-described embodiment will be described with reference to FIG. 19B.

Figure 19B:
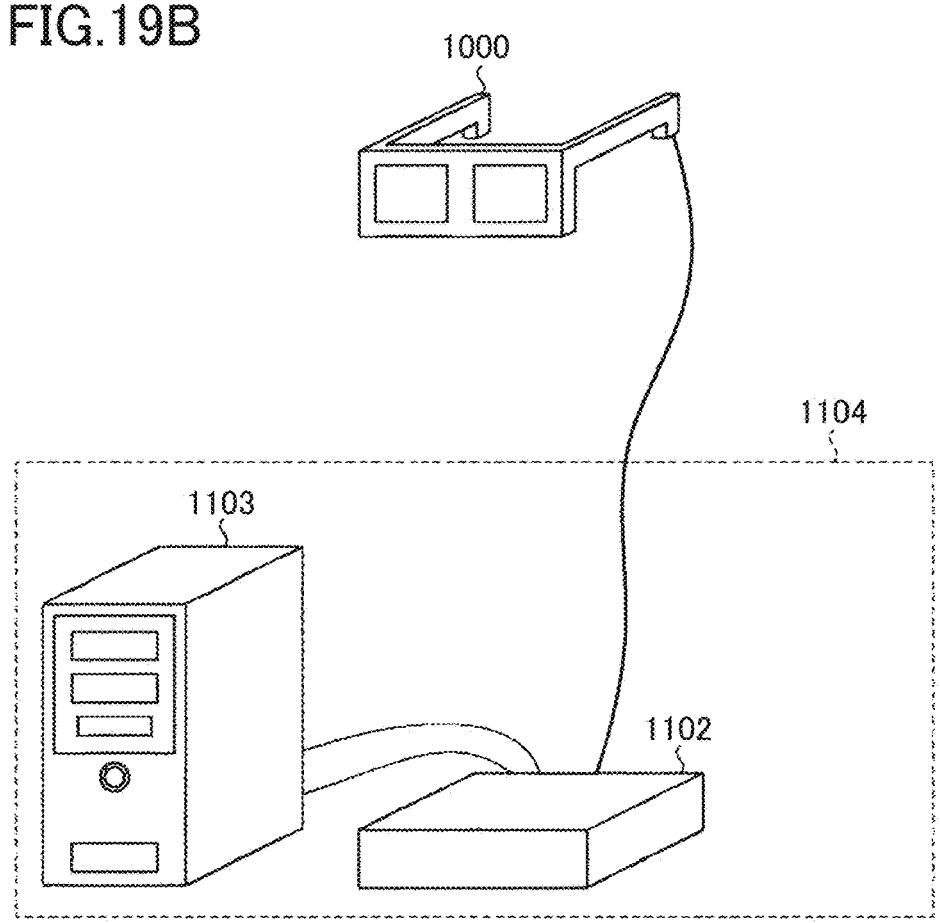
FIG. 19B is a diagram illustrating an MR system of an embodiment.

As illustrated in FIG. 19B, the MR system of the present embodiment includes the HMD 1000, a computer apparatus 1103, and a controller 1102. The HMD 1000 is one example of head-mounted display apparatuses. The computer apparatus 1103 produces an image of a mixed-reality space (i.e., a space in which a real space and a virtual space are mixed with each other), which is to be displayed on the HMD 1000. The controller 1102 serves an interface between the HMD 1000 and the computer apparatus 1103.

The HMD 1000 includes the image pickup portion 1020 that captures an image of a scene of the real space; a sensor that measures (or performs a measurement process) the position and posture of the HMD 1000; and the display portion 1040 that displays an image of the mixed-reality space, sent from an image processing apparatus 1104. The HMD 1000 serves also as a synchronization control apparatus that controls the synchronization of the plurality of apparatuses. The HMD 1000 sends an image captured by the image pickup portion, and the data on the position and posture of the HMD 1000, to the controller 1102. In addition, the HMD 1000 receives an image of the mixed-reality space that the computer apparatus 1103 has produced, depending on the image captured by the image pickup portion and the data on the position and posture of the HMD 1000; and displays the image on the display portion. As a result, the image of the mixed-reality space will be displayed in front of the eyes of a user who wears the HMD 1000 on his/her head.

The HMD 1000 may operate with power supplied from the controller 1102, or with power supplied from the battery of the HMD 1000. That is, the method of supplying power to the HMD 1000 is not limited to a specific method. In FIG. 19B, the HMD 1000 and the controller 1102 are connected with each other via wire. However, the connection between the HMD 1000 and the controller 1102 is not limited to the wired connection. For example, the connection between the HMD 1000 and the controller 1102 may be wireless connection or combination of wired connection and wireless connection. That is, the connection between the HMD 1000 and the controller 1102 is not limited to a specific type of connection.

Next, the controller 1102 will be described. The controller 1102 performs various types of image processing (e.g., resolution conversion, color-space conversion, distortion compensation for the optical system of the image pickup portion of the HMD 1000, and encoding) on an image captured by the image pickup portion and sent from the HMD 1000. The controller 1102 then sends the image-processed image and the data on the position and posture, sent from the HMD 1000, to the computer apparatus 1103. In addition, the controller 1102 performs the same image processing on an image of a scene of the mixed-reality space, sent from the computer apparatus 1103; and sends the image-processed image to the HMD 1000.

Next, the computer apparatus 1103 will be described. The computer apparatus 1103 determines the position and posture (i.e., the position and posture of the image pickup portion of the HMD 1000), based on the image captured by the image pickup portion and sent from the controller 1102; and produces an image of a scene of a virtual space, viewed from the determined position and posture. The computer apparatus 1103 then produces a composite image (i.e., an image of the mixed-reality space) of the image of the scene of the virtual space and the image captured by the image pickup portion and sent from the HMD 1000 via the controller 1102, and sends the composite image to the controller 1102. Note that although the computer apparatus 1103 and the controller 1102 are separated from each other in FIG. 19B, the computer apparatus 1103 and the controller 1102 may be integrated with each other.

The MR system of the present embodiment includes the HMD 1000 of the above-described embodiment. Since the HMD 1000 includes the prisms that have less internal strain and welds formed out of the optical-surface effective area, the HMD 1000 can capture and display a high-quality image. Thus, the MR system of the present embodiment can provide a high quality mixed-reality space (in which a real space and a virtual space are mixed with each other) to users. Note that the method of incorporating the HMD of the above-described embodiments into the MR system is not limited to the example illustrated in FIG. 19B, and can be modified as appropriate. In addition, the system into which the HMD of the above-described embodiment is incorporated is not limited to the MR system, and may be an augmented reality (AR) system, a virtual reality (VR) system, or another system.

Modification of Embodiments

The above-described embodiments can be modified as appropriate, without departing the technical concept of the present disclosure. For example, a plurality of embodiments may be combined with each other. In addition, part of features of at least one embodiment may be deleted, or may be replaced with part of other features.

As can be clearly seen from the above description, since the present invention provides the technique that can reduce the strain and prevent the optical performance from deteriorating, the present invention can also be applied to an optical element made of resin and other than the optical prism. In addition, the optical prism may be a pentaprism used for a single-lens reflex camera, or may be a prism used for a view-finder optical system of a mirrorless camera. For example, the present disclosure may be embodied for an optical element, such as a lens made of resin, that includes a plurality of optical surfaces and a plurality of non-optical surfaces, or for a method of manufacturing the optical element. In addition, the present disclosure may be embodied for an optical apparatus that includes the optical element, or for a system that includes the optical apparatus.

One aspect of the present invention is an optical element made of resin. The optical element includes a plurality of optical surfaces and a plurality of non-optical surfaces. One of the plurality of non-optical surfaces is a first side surface that connects to the plurality of optical surfaces. A first projecting portion projects from the first side surface. A weld is formed in any one of the non-optical surfaces and/or at a position in any one of the optical surfaces, and the distance from the outer edge of the optical surface to the position is equal to or smaller than 5 mm. However, the weld is not formed at a position inside any one of the optical surfaces, and the distance from the outer edge of the optical surface to the position is larger than 5 mm.

Another one aspect of the present invention is a method of manufacturing an optical element made of resin. The optical element includes a plurality of optical surfaces and a plurality of non-optical surfaces. The method includes inserting a first molded portion made of resin, into a cavity of a mold that includes a transfer surface. The transfer surface is a surface for forming the plurality of optical surfaces and at least one portion of the plurality of non-optical surfaces, through transfer. The method further includes injecting molten resin from a gate into a space between the first molded portion and the transfer surface of the mold and forming a second molded portion outside the first molded portion. The molten resin injected from the gate is split and flows along the first molded portion, and then one portion of the molten resin and another portion of the molten resin meet with each other and form a weld. The weld is formed in the non-optical surface and/or at a position in an area of the optical surface (the shape of the area is formed in the second molded portion through transfer), and the distance from the outer edge of the optical surface to the position is equal to or smaller than 5 mm. However, the weld is not formed at a position inside an area of the optical surface (the shape of the area is formed in the second molded portion through transfer), and the distance from the outer edge of the optical surface to the position is larger than 5 mm.

In addition, at least one embodiment can be added with a new feature. Note that the disclosure of the present specification includes not only features that are explicitly described in the present specification, but also all features that can be understood from the present specification and the drawings attached to the present specification.

Furthermore, the contents of disclosure in the present specification include not only contents described in the present specification but also all of the items which are understandable from the present specification and the drawings accompanying the present specification. Moreover, the contents of disclosure in the present specification include a complementary set of concepts described in the present specification. Thus, if, in the present specification, there is a description indicating that, for example, "A is B", even when a description indicating that "A is not B" is omitted, the present specification can be said to disclose a description indicating that "A is not B". This is because, in a case where there is a description indicating that "A is B", taking into consideration a case where "A is not B" is a premise.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-52302, filed Mar. 28, 2022, which is hereby incorporated by reference herein in its entirety.

What is claimed is:

1. An optical element made of resin, comprising:
   a first surface configured to serve as an optical surface;
   a second surface configured to serve as an optical surface;
   a third surface configured to serve as an optical surface; and
   a fourth surface configured to connect to the third surface,
   wherein the third surface includes a peripheral area and an inner area, and a distance from an outer edge of the third surface to a position in the peripheral area is equal to or smaller than 5 mm and a distance from the outer edge of the third surface to a position in the inner area is larger than 5 mm, and
   wherein a weld is formed in at least any one of the peripheral area of the third surface and the fourth surface.

2. The optical element according to claim 1, further comprising:
   a fifth surface configured to connect to the first surface,
   wherein a first projecting portion is configured to project from the fifth surface.

3. The optical element according to claim 2, wherein the weld is formed along a direction in which the first projecting portion projects.

4. The optical element according to claim 2, wherein when viewed from a direction toward which the first projecting portion projects, the weld is formed at a position opposite to a center of gravity of the optical element with respect to the first projecting portion.

5. An optical apparatus wherein the optical element according to claim 2 is fixed to a support member via at least the first projecting portion.

6. The optical element according to claim 2, wherein the optical element includes a first molded portion that is a core portion, and a second molded portion that is formed outside the first molded portion, and
wherein the first surface, the second surface, and the third surface are formed on a surface of the second molded portion.

7. The optical element according to claim 6, wherein a gate mark that is one portion of the second molded portion is formed on a leading end of the first projecting portion.

8. The optical element according to claim 6, further comprising:
a sixth surface formed opposite to the fifth surface with respect to a portion formed between at least two of the first surface, the second surface, and the third surface,
wherein a second projecting portion having a gate mark formed on a leading end of the second projection portion is configured to project from the sixth surface, and
wherein the gate mark formed on the leading end of the second projecting portion is one portion of the first molded portion.

9. The optical element according to claim 8, wherein the weld is formed closer to the first projecting portion than to the second projecting portion.

10. The optical element according to claim 6, wherein the first projecting portion includes a portion of the first molded portion and a portion of the second molded portion, and
wherein an area of an outer surface of the portion of the second molded portion closer to a center of gravity of the optical element is larger than an area of a surface of the portion of the second molded portion separated more from the center of gravity of the optical element.

11. The optical element according to claim 6, wherein the first projecting portion includes a portion of the first molded portion and a portion of the second molded portion, and
wherein an area of an outer surface of the portion of the second molded portion separated more from the weld is larger than an area of a surface of the portion of the second molded portion closer to the weld.

12. The optical element according to claim 1, wherein a surface roughness Ra of the fourth surface is larger than a surface roughness Ra of the third surface.

13. The optical element according to claim 1, wherein a surface roughness Ra of the third surface is smaller than 20 nm, and a surface roughness Ra of the fourth surface is equal to or larger than 50 nm.

14. The optical element according to claim 1, wherein the optical element is a prism.

15. The optical element according to claim 14, wherein the second surface is a reflection surface.

16. The optical element according to claim 1, wherein at least one of the first surface, the second surface, and the third surface is a free-form surface.

17. An optical apparatus comprising:
the optical element according to claim 1; and
a support member configured to support the optical element.

18. The optical apparatus according to claim 17, further comprising:
an optical unit used for a right eye and including a display portion that includes the optical element; and
an optical unit used for a left eye and including a display portion that includes the optical element.

19. A system comprising:
the optical apparatus according to claim 17; and
a computer apparatus configured to produce an image of a virtual space.

20. A method of manufacturing an optical element made of resin,
the optical element including
a first surface that serves as an optical surface,
a second surface that serves as an optical surface,
a third surface that serves as an optical surface, and
a fourth surface that connects to the third surface,
the method comprising:
inserting a first molded portion made of resin, into a cavity of a mold that includes a transfer surface, the transfer surface including a surface for forming the first surface, the second surface, the third surface, and the fourth surface through transfer; and
injecting molten resin from a gate into a space between the first molded portion and the transfer surface of the mold and forming a second molded portion outside the first molded portion,
wherein the molten resin injected from the gate is split and flows along the first molded portion, and then one portion of the molten resin and another portion of the molten resin meet with each other and form a weld,
wherein the third surface includes a peripheral area and an inner area, and a distance from an outer edge of the third surface to a position in the peripheral area is equal to or smaller than 5 mm and a distance from the outer edge of the third surface to a position in the inner area is larger than 5 mm, and
wherein the weld is formed in at least any one of the peripheral area of the third surface and the fourth surface.

* * * * *